(12) United States Patent
Nojiri et al.

(10) Patent No.: US 10,891,909 B2
(45) Date of Patent: Jan. 12, 2021

(54) DISPLAY DEVICE AND METHOD FOR DRIVING SAME

(71) Applicant: Mitsubishi Electric Corporation, Tokyo (JP)

(72) Inventors: Isao Nojiri, Tokyo (JP); Hiroyuki Murai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/022,774

(22) Filed: Jun. 29, 2018

(65) Prior Publication Data
US 2019/0019465 A1 Jan. 17, 2019

(30) Foreign Application Priority Data
Jul. 11, 2017 (JP) ................. 2017-135313

(51) Int. Cl.
| | | |
|---|---|---|
| *G09G 3/36* | (2006.01) | |
| *H04N 13/359* | (2018.01) | |
| *H04N 13/324* | (2018.01) | |
| *H04N 13/31* | (2018.01) | |
| *G09G 3/00* | (2006.01) | |
| *H04N 13/356* | (2018.01) | |
| *G02B 30/27* | (2020.01) | |

(52) U.S. Cl.
CPC .......... *G09G 3/3614* (2013.01); *G02B 30/27* (2020.01); *G09G 3/003* (2013.01); *H04N 13/31* (2018.05); *H04N 13/324* (2018.05); *H04N 13/356* (2018.05); *H04N 13/359* (2018.05); *G09G 2320/0247* (2013.01); *G09G 2340/0457* (2013.01)

(58) Field of Classification Search
CPC .. G09G 3/3614; G02B 27/2214; G02B 27/22; H04N 13/31; H04N 13/305; H04N 13/315
See application file for complete search history.

(56) References Cited

U.S. PATENT DOCUMENTS

| | | | |
|---|---|---|---|
| 6,552,706 B1 * | 4/2003 | Ikeda | ................... G09G 3/3607 345/100 |
| 6,888,604 B2 | 5/2005 | Rho et al. | |
| 7,920,114 B2 | 4/2011 | Shiomi | |
| 8,207,924 B2 | 6/2012 | Horiuchi et al. | |
| (Continued) | | | |

FOREIGN PATENT DOCUMENTS

| | | | |
|---|---|---|---|
| JP | 2857429 B2 | 11/1998 | |
| JP | 3096613 B2 | 8/2000 | |
| (Continued) | | | |

*Primary Examiner* — Koosha Sharifi-Tafreshi
(74) *Attorney, Agent, or Firm* — Studebaker & Brackett PC

(57) ABSTRACT

A display device includes drivers. The drivers apply a voltage having a polarity opposite to a polarity of a voltage applied to red, green, blue, and white picture elements in one first picture element columns to red, green, blue, and white picture elements in another first picture element columns adjacent to the one first picture element columns, and apply a voltage having a polarity opposite to a polarity of a voltage applied to red, green, blue, and white picture elements in one second picture element columns to red, green, blue, and white picture elements in another second picture element columns adjacent to the one second picture element columns.

10 Claims, 25 Drawing Sheets

(56) References Cited

U.S. PATENT DOCUMENTS

| | | |
|---|---|---|
| 8,717,268 B2 | 5/2014 | Itoh et al. |
| 9,715,861 B2 | 7/2017 | Kim et al. |
| 9,818,348 B2 | 11/2017 | Kitayama et al. |
| 10,140,935 B2 * | 11/2018 | Son .................. G09G 3/3607 |
| 2004/0263748 A1 * | 12/2004 | Park .................. G02F 1/134363 |
| | | 349/141 |
| 2005/0083246 A1 * | 4/2005 | Saishu .................. H04N 13/317 |
| | | 345/1.1 |
| 2005/0275610 A1 | 12/2005 | Roh et al. |
| 2008/0252578 A1 * | 10/2008 | Kim .................. G02B 30/27 |
| | | 345/87 |
| 2009/0141052 A1 * | 6/2009 | Hamagishi .............. G02B 30/27 |
| | | 345/694 |
| 2009/0189881 A1 | 7/2009 | Ooishi et al. |
| 2011/0316989 A1 * | 12/2011 | Imai .................. G09G 3/004 |
| | | 348/51 |
| 2012/0120057 A1 * | 5/2012 | Cho .................. G09G 3/003 |
| | | 345/419 |
| 2012/0268707 A1 | 10/2012 | Yamashita et al. |
| 2013/0222747 A1 | 8/2013 | Hisada et al. |
| 2014/0085439 A1 | 3/2014 | Niwano et al. |
| 2014/0225819 A1 | 8/2014 | Onuma et al. |
| 2016/0111052 A1 * | 4/2016 | Jeong .................. G09G 3/3614 |
| | | 345/209 |
| 2016/0246136 A1 * | 8/2016 | Lim .................. G09G 3/3607 |
| 2016/0286193 A1 | 9/2016 | Niwano et al. |
| 2016/0323568 A1 * | 11/2016 | Guido .................. H04N 13/324 |

FOREIGN PATENT DOCUMENTS

| | | |
|---|---|---|
| JP | 2004-078218 A | 3/2004 |
| JP | 2005-346037 A | 12/2005 |
| JP | 2006-106062 A | 4/2006 |
| JP | 2006-259135 A | 9/2006 |
| JP | 2008-076416 A | 4/2008 |
| JP | 2009-175468 A | 8/2009 |
| JP | 2011/093374 A1 | 8/2011 |
| JP | 2014-153541 A | 8/2014 |
| JP | 2014-157345 A | 8/2014 |
| JP | 6057647 B2 | 12/2016 |
| WO | 2007/088656 A1 | 8/2007 |
| WO | 2008/153003 A1 | 12/2008 |
| WO | 2011/078168 A1 | 6/2011 |
| WO | 2011/081160 A1 | 7/2011 |
| WO | 2012/063677 A1 | 5/2012 |
| WO | 2013/031610 A1 | 3/2013 |

* cited by examiner

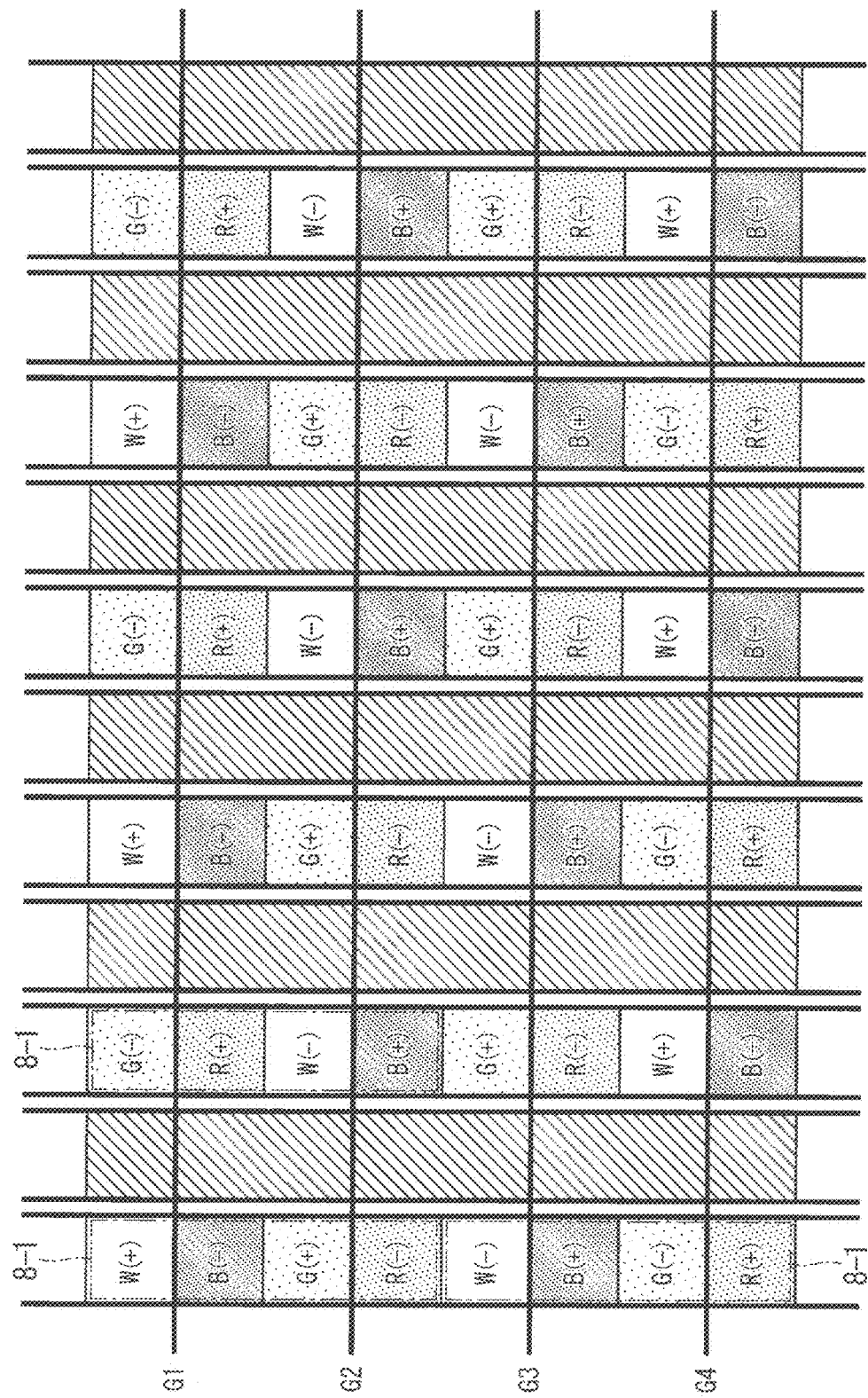
F I G. 4

FIG. 6

| | G1 | G2 | G3 | G4 | G5 | G6 | G7 | G8 | G9 | ... |
|---|---|---|---|---|---|---|---|---|---|---|
| S8 | + | + | − | − | + | + | − | − | + | ... |
| S7 | − | − | + | + | − | − | + | + | − | ... |
| S6 | − | − | + | + | − | − | + | + | − | ... |
| S5 | + | + | − | − | + | + | − | − | + | ... |
| S4 | + | + | − | − | + | + | − | − | + | ... |
| S3 | − | − | + | + | − | − | + | + | − | ... |
| S2 | − | − | + | + | − | − | + | + | − | ... |
| S1 | + | + | − | − | + | + | − | − | + | ... |

| | S1 | S2 | S3 | S4 | S5 | S6 | S7 | S8 | ... |
|---|---|---|---|---|---|---|---|---|---|
| G1 | + | − | − | + | + | − | − | + | ... |
| G4 | − | + | + | − | − | + | + | − | ... |
| G3 | − | + | + | − | − | + | + | − | ... |
| G2 | + | − | − | + | + | − | − | + | ... |
| G5 | + | − | − | + | + | − | − | + | ... |
| G8 | − | + | + | − | − | + | + | − | ... |
| G7 | − | + | + | − | − | + | + | − | ... |
| G6 | + | − | − | + | + | − | − | + | ... |
| G9 | + | − | − | + | + | − | − | + | ... |
| ... | ... | ... | ... | ... | ... | ... | ... | ... | ... |

F I G. 1 4

F I G. 15
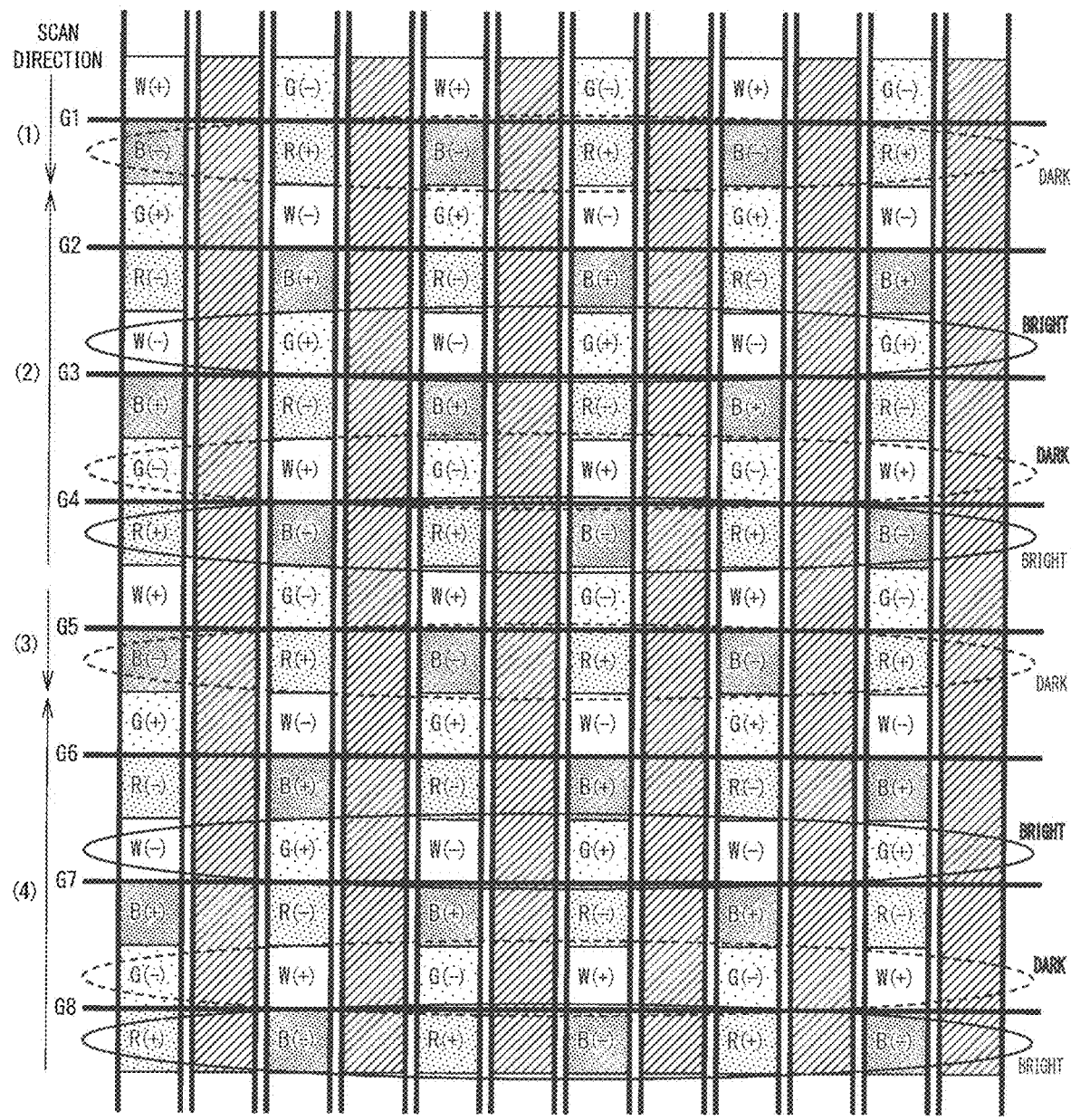

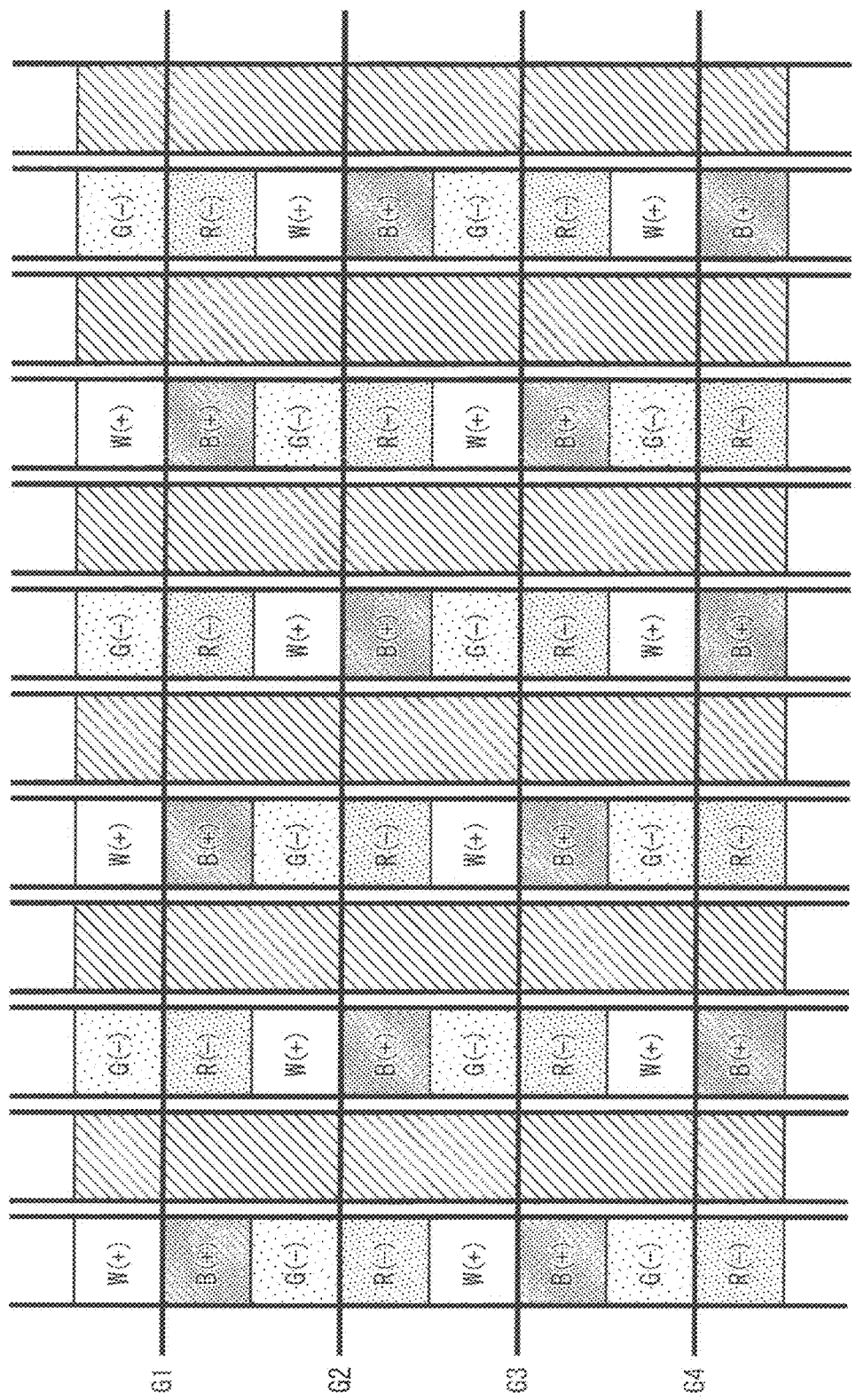

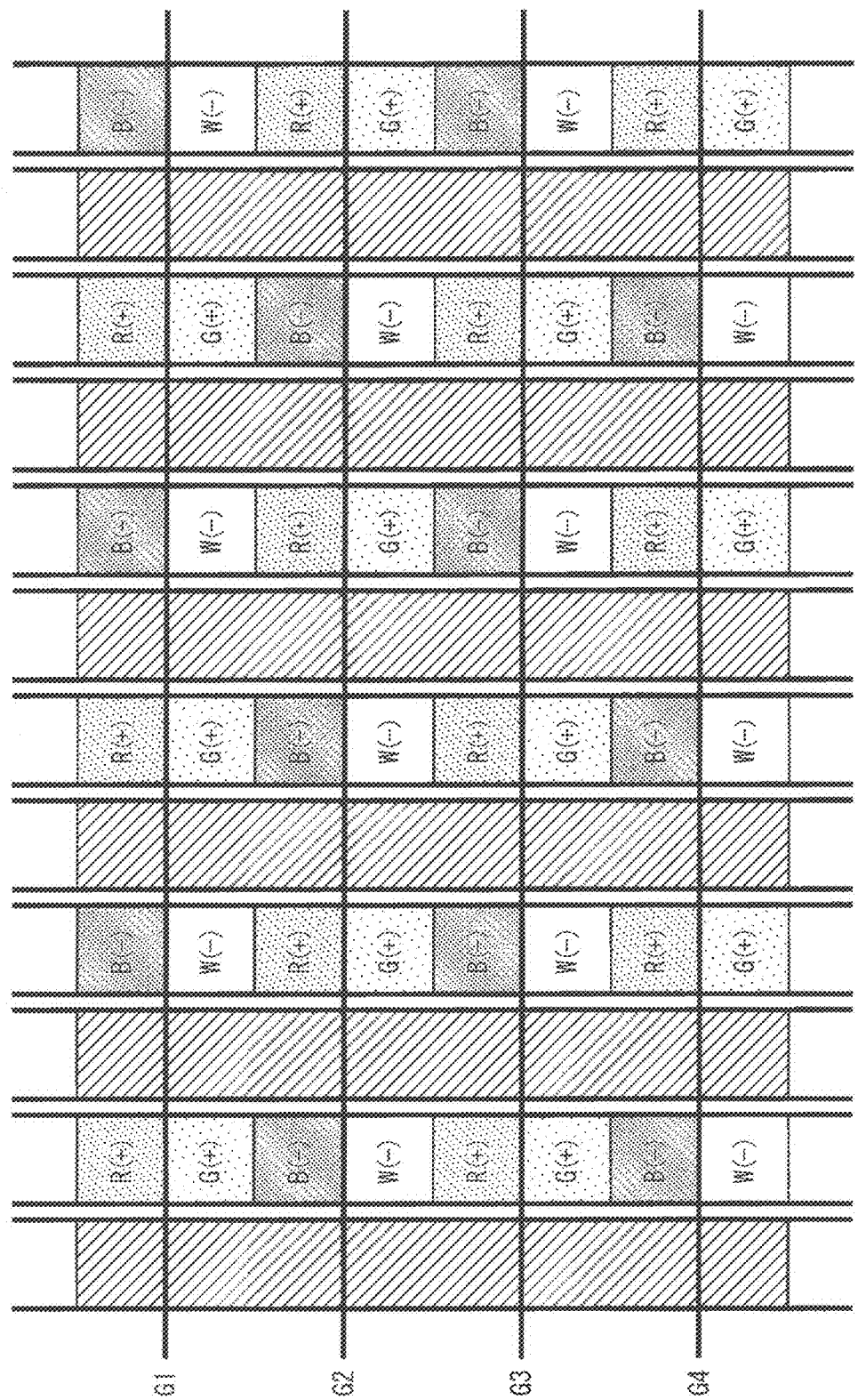

DISPLAY DEVICE AND METHOD FOR DRIVING SAME

BACKGROUND OF INVENTION

Field of the Invention

The present invention particularly relates to a display device capable of displaying a first image and a second image in parallel using a light deflecting member, such as a parallax barrier system, and a method for driving the same.

Description of the Background Art

In recent years, as a display device capable of displaying a first image and a second image in parallel, an autostereoscopic image display device capable of visually recognizing a stereoscopic image without requiring special eyeglasses has been proposed.

For example, Japanese Patent No. 2857429 discloses a three-dimensional display device including: barrier generating means for generating a parallax barrier stripe by electronically controlling a transmissive display element; a display screen disposed at a predetermined distance behind the barrier generating means and in which a stripe-shaped left eye image and a stripe-shaped right eye image are alternately arranged corresponding to the parallax barrier stripes; and image display means capable of outputting a multi-direction image to the display screen. In such a stereoscopic image display device, it is possible to electronically generate a barrier stripe and freely changeably control a shape (number, width, interval of stripes), a position (phase), density, etc. of the generated barrier stripe. Accordingly, the stereoscopic image display device can be used both as a two-dimensional image display device and as a three-dimensional image display device, and it is possible to realize a compatible image display device.

In addition, Japanese Patent No. 3096613 discloses a stereoscopic image display device including: an image display panel in which a pixel for a right eye displaying an image for a right eye and a pixel for a left eye displaying an image for a left eye are arranged alternately in all rows and all columns (arranged in a checker flag pattern shape); and an optical filter parallax barrier or lens) disposed on an observer side of this image display panel, having openings corresponding to the pixel for the right eye and the pixel for the left eye, and separating light from the pixel for the right eye and the pixel for the left eye to emit the light to the observer side.

Furthermore, Japanese Patent No. 6057647 discloses a display device having: a two-image mode in which one image can be three-dimensionally displayed by two-dimensionally displaying two images in two directions by using an optical filter (parallax barrier or lens) having a vertically striped opening; and one image mode in which one image can be two-dimensionally displayed with the parallax barrier in a full transmission state. Even in the one image mode, the display device can provide a smooth resolution feeling.

Further, PCT International Publication No. 2011/078168 discloses a liquid crystal display device in which an arrangement of pixels is devised in a two-dimensional image display device.

However, in the techniques of Japanese Patent Nos. 2857429, 3096613, and 6057647, there is a problem that a so-called flicker occurs when the first image and the second image formed by using the pixel for the right eye and the pixel for the left eye are displayed by the liquid crystal display panel. In addition, as described in PCT International Publication No. 2011/078168, there is a problem that a phenomenon called lateral shadow may occur when a window pattern is displayed in a single color in the first image and the second image.

SUMMARY

The present invention provides a technique capable of enhancing display quality in a display device capable of displaying a first image and a second image in parallel using a light deflecting member such as a parallax barrier system, and capable of performing two-dimensional display by setting a parallax barrier in a full transmission state.

The present invention relates to a display device capable of displaying a first image and a second image in parallel, and the display device includes: a display panel in which a plurality of picture element columns are arranged in a column direction and a row direction, respectively, the plurality of picture element columns each including red, green, blue and white picture elements arranged one by one in the column direction; and drivers for applying a voltage to the display panel. The first image and the second image are respectively displayed by first picture element columns and second picture element columns provided alternately along the row direction among the plurality of picture element columns. The drivers apply a voltage having a polarity opposite to a polarity of a voltage applied to red, green, blue, and white picture elements in one of the first picture element columns to red, green, blue, and white picture elements in another of the first picture element columns adjacent to the one of the first picture element columns, and apply a voltage having a polarity opposite to a polarity of a voltage applied to red, green, blue, and white picture elements in one of the second picture element columns to red, green, blue, and white picture elements in another of the second picture element columns adjacent to the one of the second picture element columns.

Since the polarities of the picture elements of each color are equally dispersed, occurrence of a flicker can be suppressed.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3, 4, and 5 are diagrams each showing a polarity arrangement of the liquid crystal display device according to the first preferred embodiment;

FIG. 6 is a diagram showing drive control of the liquid crystal display device according to the first preferred embodiment;

FIGS. 7 to 9 are diagrams each showing a polarity arrangement of a liquid crystal display device according to a second preferred embodiment;

FIG. 13 is a diagram showing drive control of a liquid crystal display device according to a third preferred embodiment;

FIGS. 14 to 16 are diagrams each showing a polarity arrangement of the liquid crystal display device according to the third preferred embodiment;

FIGS. 17 to 19 are diagrams each showing a polarity arrangement of a liquid crystal display device according to a fourth preferred embodiment;

FIGS. 20 to 22 are diagrams each showing a polarity arrangement of a first related display device; and FIGS. 23 to 25 are diagrams each showing e polarity arrangement of a second related display device.

DESCRIPTION OF THE PREFERRED EMBODIMENTS

<Related Display Devices>

First, before explaining display devices according to preferred embodiments of the present invention, first and second related display devices related to the display devices will be described.

In a configuration in which DC driving is performed to drive a picture element (subpixel) using only a voltage having the same polarity as in a conventional liquid crystal display device, there is a problem that impurities in a liquid crystal layer accumulate unevenly and the liquid crystal layer deteriorates.

In order to solve this problem, in the first and second related display devices, AC driving for periodically inverting a polarity of an electric field applied to the picture element, that is, polarity inversion driving is performed. However, in a configuration in which the polarity inversion driving is performed, a difference in luminance between when a voltage having +polarity (positive polarity) is applied and when a voltage having −polarity (negative polarity) is applied causes a nicker to occur when, for example, the polarity is inverted over an entire screen. In order to prevent this flicker from occurring, in the first and second related display devices, the picture element to which the +polarity is applied and the picture element to which the −polarity is applied are equally dispersed in a predetermined region of the display screen.

For example, in the first related display device, one color display pixel is constituted by four kinds of picture elements for displaying red, green, blue, and white, and color display is performed by controlling the luminance of each picture element. Here, in the first related display device, "one dot inversion" for inverting polarities of voltages applied to adjacent picture elements is used.

Figure 20:
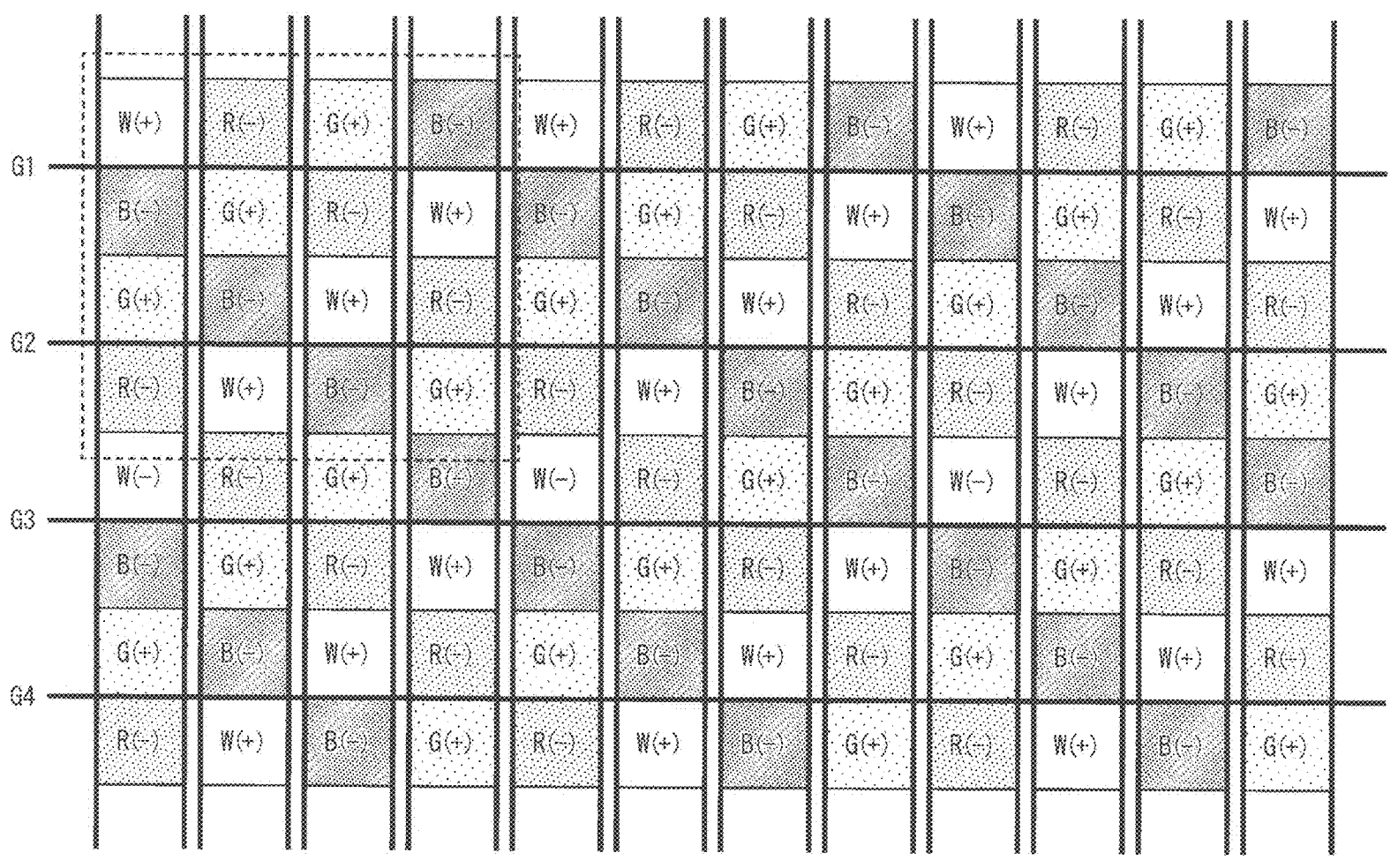
Figure 21:
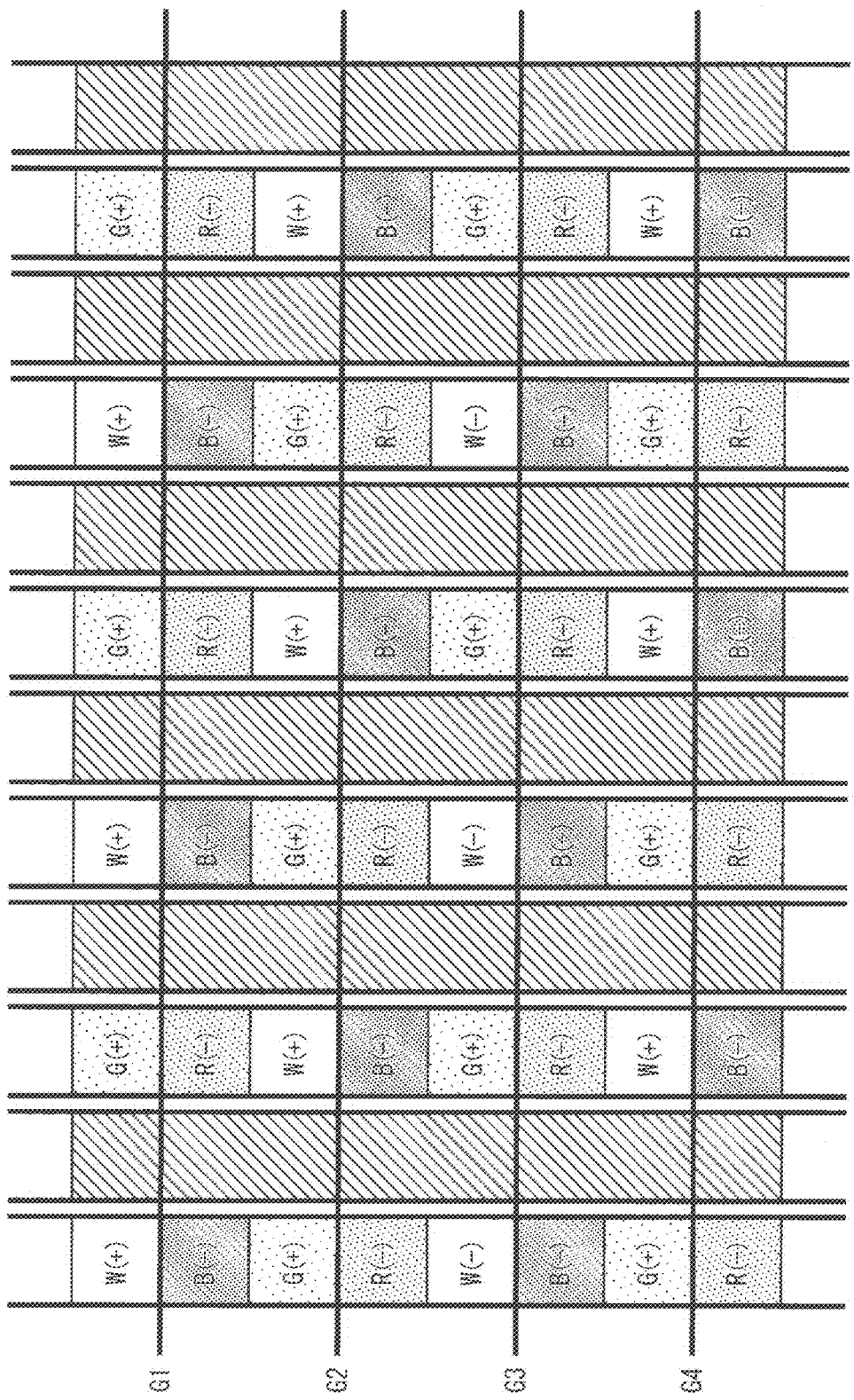
Figure 22:
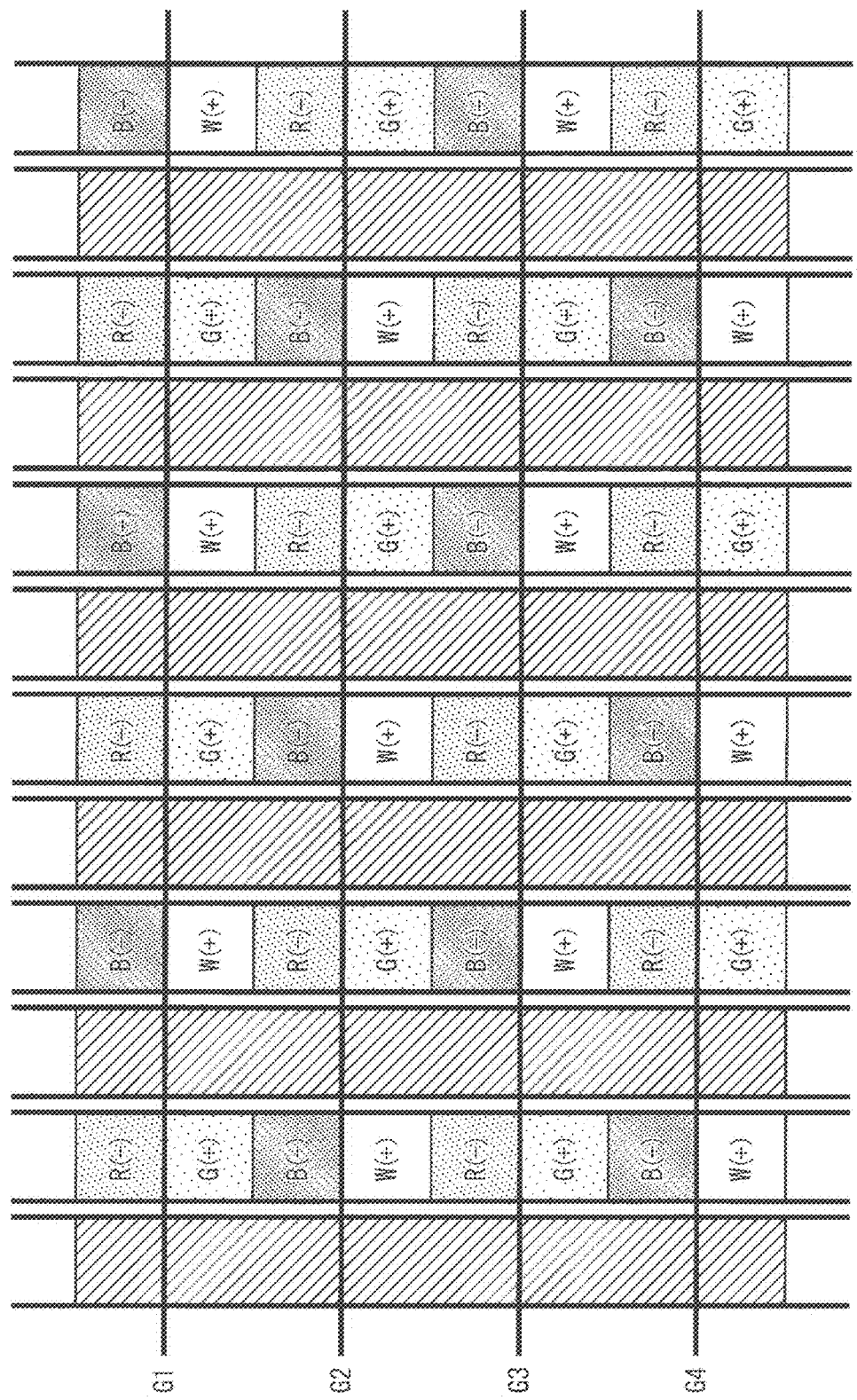

FIGS. 20 to 22 are diagrams each showing a polarity arrangement in a certain frame of the first related display device performing one dot inversion. FIG. 20 shows a polarity arrangement in a case of one image mode in which one image can be two-dimensionally displayed with high resolution with a parallax barrier in a full transmission state. FIGS. 21 and 22 each show a polarity arrangement in a case of a two-image mode in which one image can be three-dimensionally displayed by two-dimensionally displaying two images in two directions. For example, a picture element in FIG. 21 is visually recognized by a left eye, and a picture element in FIG. 22 is visually recognized by a right eye.

As shown in FIG. 20, in the case of one image mode, picture elements of each color are arranged in a tilt direction which is a direction having a tilt angle of approximately 45 degrees with respect to a row direction and a column direction of the picture elements arranged in a matrix form. With such an arrangement, it is possible to provide a smooth resolution feeling in one image mode. However, when one dot (picture element) inversion arrangement in which polarities of adjacent picture elements are inverted from each other is performed in such one image mode, as shown in FIG. 20, a voltage having the same polarity is applied to all the picture elements of each color in each frame. As a result, in a case of displaying only with picture elements of a specific color as in a case of full red display, a flicker occurs on an entire screen for each frame.

Next, the second related display device will be described. In the second related display device, 2×2 dots (picture elements) are set as one pixel (pixel), and polarity inversion is performed on a pixel unit basis.

Figure 23:
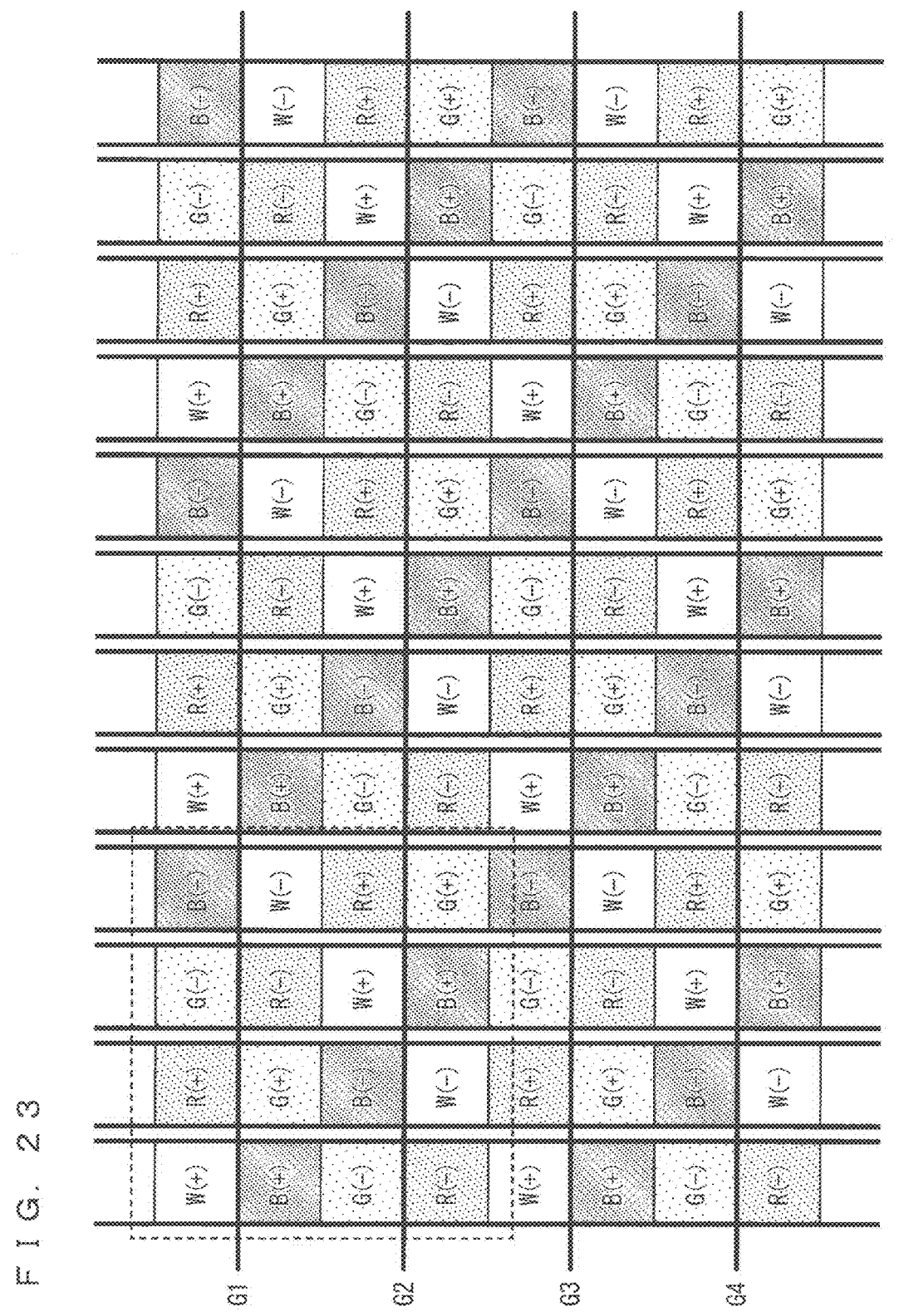

FIGS. 23 to 25 are diagrams each showing a polarity arrangement in a certain frame of the second related display device which performs polarity inversion on a pixel unit basis. FIG. 23 shows a polarity arrangement in a case of one image mode, and FIGS. 21 and 22 each show a polarity arrangement in a case of two-image mode.

As shown in FIG. 23, in the one image mode, since voltages of mutually different polarities are applied to adjacent picture elements of each color in each frame, no particular problem occurs. However, as shown in FIGS. 24 and 25, in the two-image mode, a voltage having the same polarity is applied to all the picture elements of each color in each of the images for the left eye and the right eye in each frame. As a result, in a case of displaying only with picture elements of a specific color, for example, in a case of full red display in each of the images for the left eye and the right eye, a flicker occurs on an entire screen for each frame.

On the other hand, in accordance with the liquid crystal display devices according to the preferred embodiments of the present invention described below, it is possible to suppress the flicker as described above and a lateral shadow that has occurred in the conventional art.

First Preferred Embodiment

Figure 1:
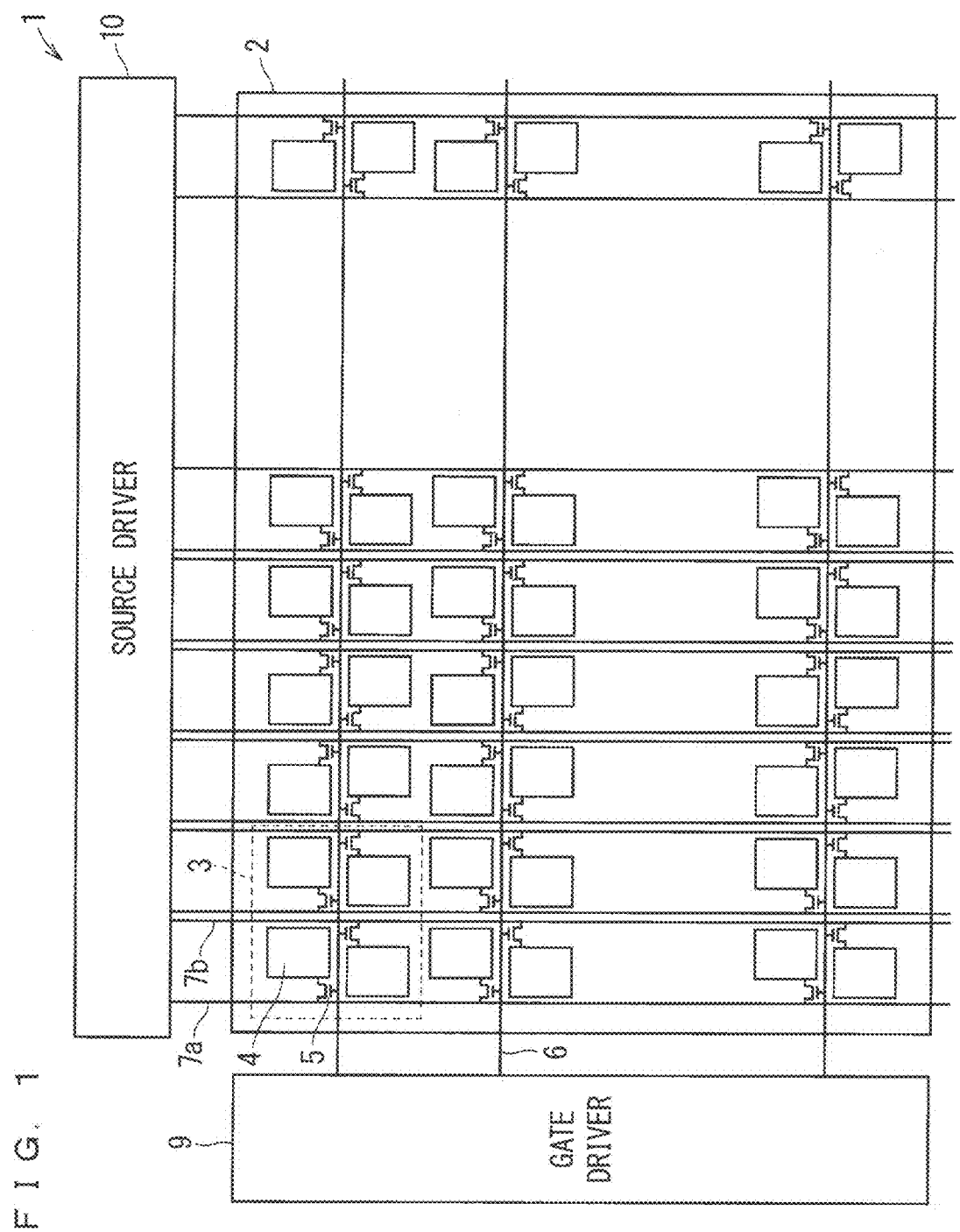
FIG. 1 is a block diagram showing a configuration of a liquid crystal display device according to a first preferred embodiment.

FIG. 1 is a diagram showing a configuration of a liquid crystal display device 1 according to a first preferred embodiment of the present invention. The liquid crystal display device 1 in FIG. 1 includes a transmissive liquid crystal panel 2, a gate driver 9, and a source driver 10. The liquid crystal panel 2 is a display panel, and the gate driver 9 and the source driver 10 are drivers.

The liquid crystal panel 2 includes, as one pixel (pixel) 3, a total of four picture elements (sub-pixels) 4 arranged in two rows in a vertical direction and two columns in a horizontal direction. A color of the picture element 4 is determined by a color of a color filter provided in each picture element region. Note that an arrangement of the color filters, that is, an arrangement of colors of the picture elements 4 will be described later with reference to FIG. 2 and the like.

The liquid crystal panel 2 is provided with a plurality of the picture elements 4 arranged in a matrix form and is provided with a gate wiring line 6 and a source wiring line 7. Each picture element 4 is provided with a liquid crystal layer (not shown) and a TFT (Thin Film Transistor) 5 as a switching element. The TFT 5 is turned on or off by a voltage front the gate wiring line 6, and the TFT 5 that has been turned on applies a voltage from the source wiring line 7 to the liquid crystal layer of the picture element 4. In this manner, the TFT 5 changes an alignment state of liquid crystal molecules of the liquid crystal layer by controlling the voltage applied to the liquid crystal layer of the picture element 4 based on the voltages from the gate wiring line 6 and the source wiring line 7, thereby controlling a light transmittance at the picture element 4. In the liquid crystal panel 2, a common electrode (not shown) is provided. This common electrode is an electrode fixed to a potential common to an entire region in an image display surface and is an electrode for applying a voltage to the liquid crystal layer.

Between the picture elements 4 of two rows constituting one pixel 3, the gate wiring line 6 is provided along a row direction. All of the TFTs 5 of the four picture elements 4 constituting one pixel 3 are connected to the same gate wiring line 6. When the gate driver 9 sequentially selects (scans) the gate wiring line 6, the picture elements 4 for two rows, in other words, the pixel 3 for one row are all selected (scanned) at the same time. In the following description, connecting the gate wiring line 6 and the TFT 5 provided in the picture element 4 is sometimes appropriately referred to as connecting the gate wiring line 6 and the picture element 4 for short, and connecting the source wiring line 7 and the TFT 5 provided in the picture element 4 is sometimes appropriately referred to as connecting the source wiring line 7 and the picture element 4 for short.

On left and right sides of each picture element 4, two source wiring lines 7 are provided along a column direction of the picture element so as to be orthogonal to the gate wiring line 6. As described above, when the gate wiring line 6 is selected, the picture elements 4 for two rows connected to the gate wiring line 6 are selected. The liquid crystal display device 1 is configured so that voltages serving as image display signals from the two source wiring lines 7 are respectively applied to two picture elements 4 arranged in one row, that is, vertically aligned, among the selected picture elements 4 for two rows. As shown in FIG. 1, the two source wiring lines 7 according to the first preferred embodiment include a source wiring line 7a provided on the left side of each picture element 4 (hereinafter also referred to as "left source wiring line 7a") and a source wiring line 7b provided on the right side of each picture element 4 (hereinafter also referred to as "right source wiring line 7b").

In the liquid crystal panel 2 in FIG. 1, among the picture elements 4 on the leftmost side, the left source wiring line 7a is connected to the TFT 5 of the picture element 4 belonging to an odd-numbered row from the top, and the right source wiring line 7b is connected to the TFT 5 of the picture element 4 belonging to an even-numbered row from the top. Similarly, the second picture element 4 from the left is connected to another source wiring line 7a, 7b.

On the other hand, the third and fourth picture elements 4 from the left are connected in reverse. In other words, among the third and fourth picture elements 4 from the left, the right source wiring line 7b is connected to the TFT 5 of the picture element 4 belonging to the odd-numbered row from the top, and the left source wiring line 7a is connected to the TFT of the picture element 4 belonging to the even-numbered row from the top.

The gate driver 9 and the source driver 10 are configured to apply a voltage to the liquid crystal panel 2 provided with the picture elements 4. The gate wiring line 6 is connected to the gate driver 9, and the source wiring lines 7a, 7b are both connected to the source driver 10. The source driver 10 applies gradation signals, via the source wiring lines 7a, 7b, to the picture elements 4 of two rows selected by the gate driver 9 via the gate wiring line 6. The gradation signal is an image display signal for applying image information to each picture element 4 to display an image on the image display surface, on which the picture elements 4 are provided.

By sequentially applying the image information to the picture elements 4 as described above while sequentially selecting the gate wiring lines 6, image information of one frame is applied to all the picture elements 4 provided on the image display surface of the liquid crystal panel 2. As a result, an image is displayed in the image display surface.

Although not shown, the liquid crystal display device 1 includes a backlight as a light source which irradiates light transmitted through the liquid crystal panel 2, a power supply circuit which supplies operating voltages to the gate driver 9 and the source driver 10, and a signal processing circuit which processes an image signal and the like.

Although not shown, the liquid crystal display device 1 has an optical element capable of displaying a first image displayed by some of the picture elements 4 and a second image displayed by the remaining picture elements 4 in two directions. The optical element includes, for example, a parallax barrier and a lenticular lens. The liquid crystal display device 1 thus configured can display the first image and the second image in parallel. Here, displaying the first image and the second image in parallel includes displaying the first image and the second image at the same time, selectively displaying the first image and the second image with a speed that cannot be felt by a person, and the like. In such a liquid crystal display device 1, when a user sees two slightly different images as the first image and the second image with a left eye and a right eye, the user can see a three-dimensional image with naked eyes.

Figure 2:
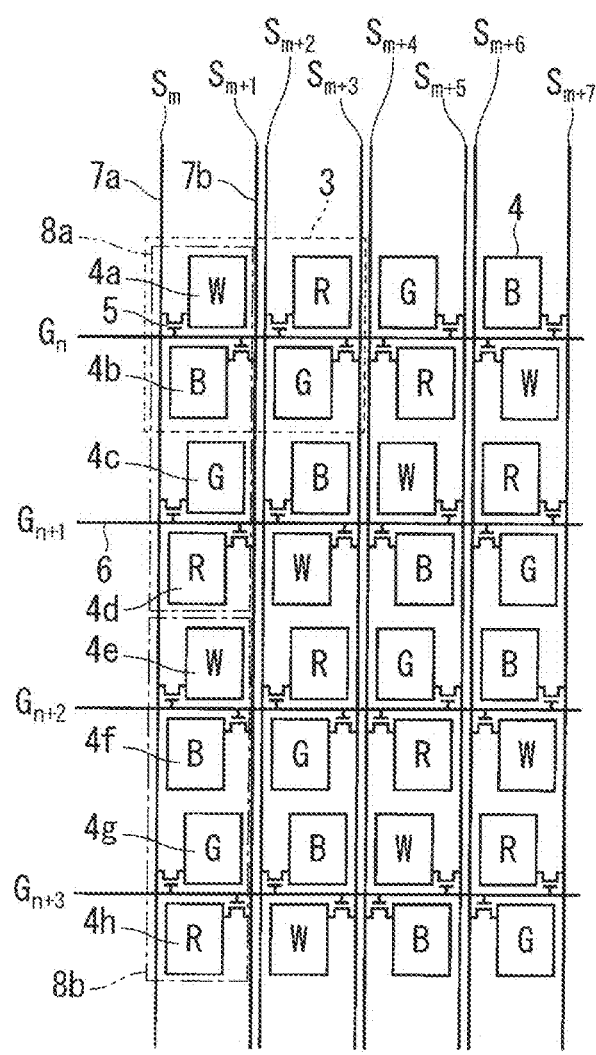
FIG. 2 is a block diagram showing a configuration of a liquid crystal panel according to the first preferred embodiment.

Next, an arrangement of the picture elements 4 of the liquid crystal panel 2 according to the first preferred embodiment will be described with reference to FIG. 2. In FIG. 2, colors of the picture elements 4 are shown. The picture elements 4 of the liquid crystal panel 2 according to the first preferred embodiment include white (W) in addition to ordinary picture elements of three colors of red (R), green (G), and blue (B). In such a configuration in which white (W) is added, display luminance can be increased.

Here, in the liquid crystal panel 2, a plurality of picture element columns is arranged in the column direction and the row direction, respectively. In FIG. 2, picture element columns 8a, 8b are indicated by one-dot chain lines.

Each of the picture element columns 8a, 8b is formed of picture elements 4 of red, green, blue and white arranged one by one in the column direction. Specifically, the one picture element column 8a includes a white picture element 4a as a first picture element, a blue picture element 4b as a second picture element, a green picture element 4c as a third picture element, and a red picture element 4d as a fourth picture element, which are arranged in this order in a forward direction of the column direction. The other picture element column 8b adjacent to the one picture element column 8a in the column direction includes a white picture element 4e as a fifth picture element, a blue picture element 4f as a sixth picture element, a green picture element 4g as a seventh picture element, and a red picture element 4h as an eighth picture element, which are arranged in this order in the forward direction of the column direction.

As shown in FIG. 2, the green and white picture elements 4 constituting the plurality of picture element columns are each arranged in a first tilt direction which is a direction from the lower left to the upper right. On the other hand, the red and blue picture elements 4 constituting the plurality of picture element columns are each arranged in a second tilt direction which is different from the first tilt direction and which is a direction from the lower right to the upper left.

Next, details of the picture element 4, the gate wiring line 6, and the source wiring line 7 will be described.

The picture elements 4a, 4b adjacent in the column direction are connected to an nth gate wiring line 6 which is a first gate wiring line denoted as $G_n$ in FIG. 2. The picture elements 4c, 4d adjacent in the column direction are connected to an (n+1)th gate wiring line 6 which is a second gate wiring line denoted as $G_{n+1}$ in FIG. 2. The picture elements 4e, 4f adjacent in the column direction are connected to an (n+2)th gate wiring line 6 which is a third gate wiring line denoted as $G_{n+2}$ in FIG. 2. The picture elements 4g, 4h adjacent in the column direction are connected to an (n+3)th gate wiring line 6 which is a fourth gate wiring line denoted as $G_{n+3}$ in FIG. 2. For example, $G_n$=G1, $G_{n+1}$=G2, $G_{n+2}$=G3, and $G_{n+3}$=G4.

The source wiring line 7 is provided on each of the left and right sides of each picture element column and is connected to the TFT 5 provided in the picture element 4 constituting the corresponding picture element column.

For example, in the picture element column 8a in a first column from the left, that is, the picture element column 8a in which the white (W) picture element 4a, the blue (B) picture element 4b, the green (G) picture element 4c, and the red (R) picture element 4d are arranged in this order from the top, the white (W) picture element 4a and the green (G) picture element 4c are connected to the left source wiring line 7a which is a first source wiring line denoted as $S_m$ in FIG. 2. Moreover, in the picture element column 8a, the blue (B) picture element 4b and the red (R) picture element 4d are connected to the right source wiring line 7b which is a second source wiring line denoted as $S_{m+1}$ in FIG. 2.

Likewise, in the picture element column 8b in the first column from the left, that is, the picture element column 8b in which the white (W) picture element 4e, the blue (B) picture element 4f, the green (G) picture element 4g, and the red (R) picture element 4h are arranged in this order from the top, the white (W) picture element 4e and the green (G) picture element 4g are connected to the left source wiring line 7a denoted as $S_m$ in FIG. 2. Moreover, in the picture element column 8b, the blue (B) picture element 4f and the red (R) picture element 4h are connected to the right source wiring line 7b denoted as $S_{m+1}$ in FIG. 2.

In a picture element column in a second column from the left, that is, a picture element column in which the red (R), green (G), blue (B), and white (W) picture elements 4 are arranged in this order from the top, the red (R) and blue (B) picture elements 4 are connected to a left source wiring line 7a denoted as $S_{m+2}$ in FIG. 2, and the green (G) and white (W) picture elements 4 are connected to a right source wiring line 7b denoted as $S_{m+3}$ in FIG. 2.

In a picture element column in a third column from the left, that is, a picture element column in which the green (G), red (R), white (W), and blue (B) picture elements 4 are arranged in this order from the top, the red (R) and blue (B) picture elements 4 are connected to a left source wiring line 7a denoted as $S_{m+4}$ in FIG. 2, and the green (G) and white (W) picture elements 4 are connected to a right source wiring line 7b denoted as $S_{m+5}$ in FIG. 2.

In a picture element column in a fourth column from the left, that is, a picture element column in which the blue (B), white (W), red (R), and green (G) picture elements 4 are arranged in this order from the top, the white (W) and green (G) picture elements 4 are connected to a left source wiring line 7a denoted as $S_{m+6}$ in FIG. 2, and the blue (B) and red (R) picture elements 4 are connected to a right source wiring line 7b denoted as $S_{m+7}$ in FIG. 2.

Figure 3:
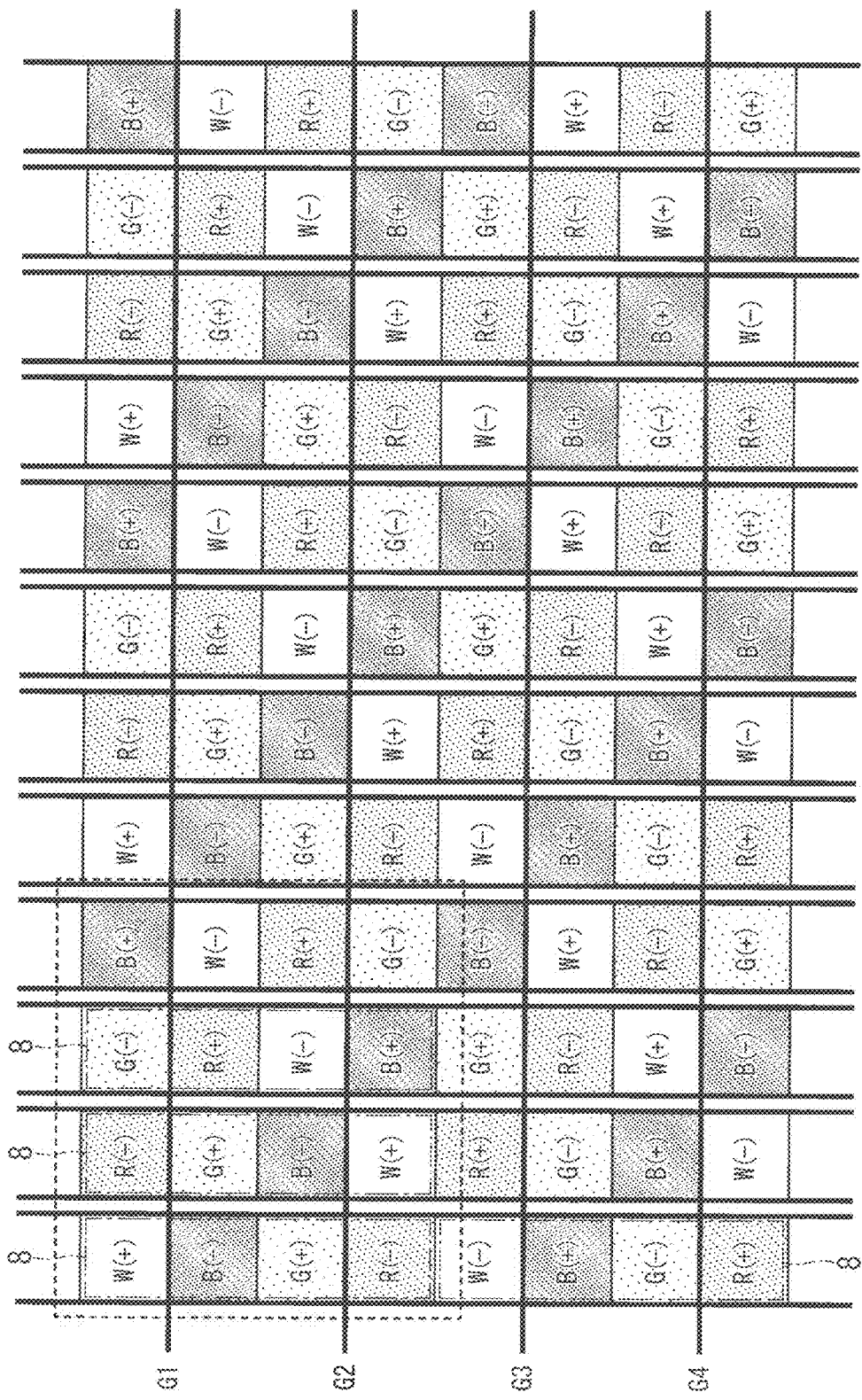
Figure 5:
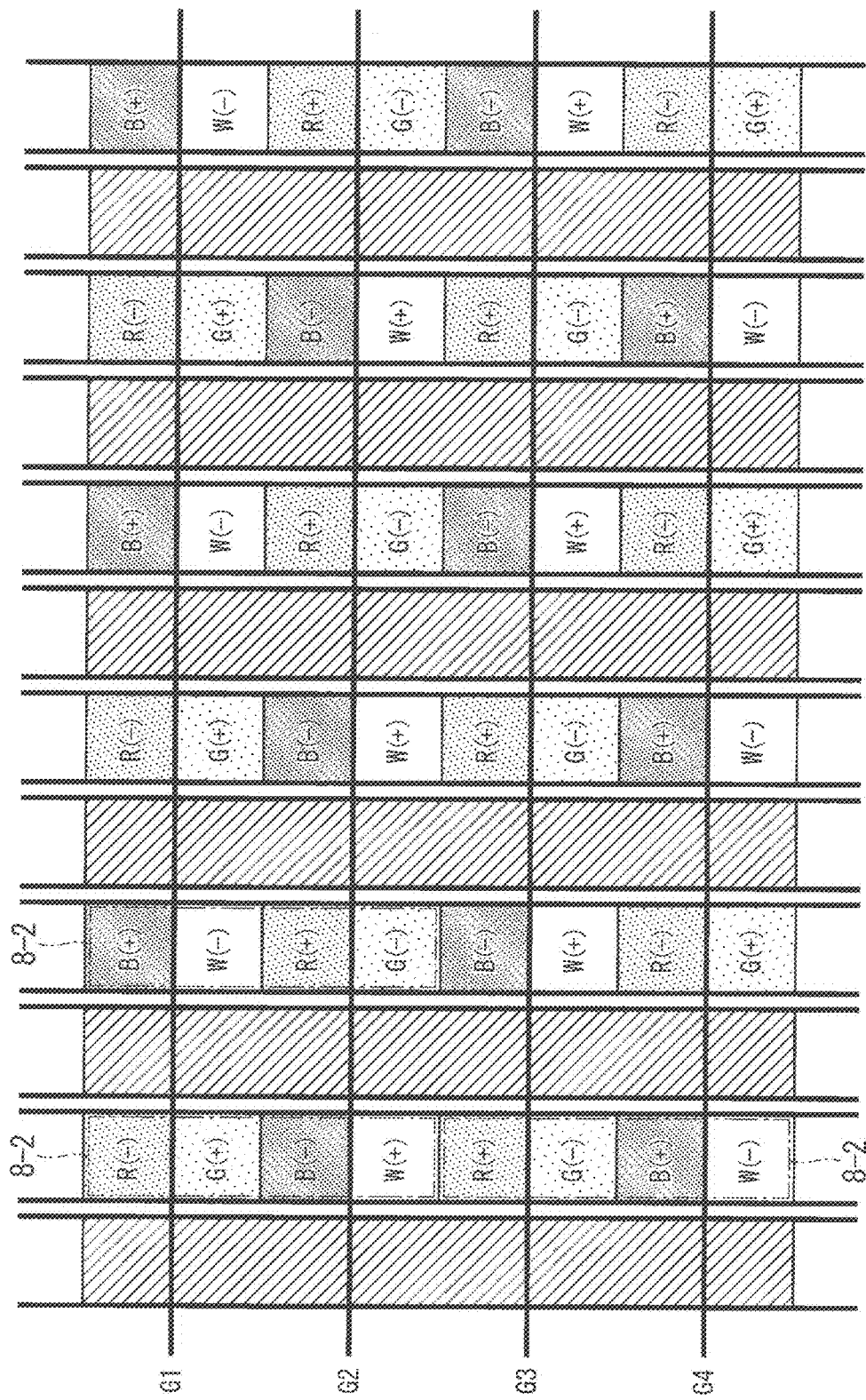

FIGS. 3, 4, and 5 are diagrams each showing a polarity arrangement in a certain frame of the liquid crystal panel 2 according to the first preferred embodiment. FIG. 3 shows picture elements 4 for 8 picture element rows×12 picture element columns obtained by repeating a picture element matrix of 4 picture element rows×4 picture element columns surrounded by a broken line square. In this manner, the image display surface of the liquid crystal panel 2 is formed by repeating the picture elements 4 of 4 picture element rows×4 picture element columns.

FIG. 4 shows the picture elements 4 used for displaying the first image seen from one direction, and FIG. 5 shows the picture elements 4 used for displaying the second image seen from another direction. As shown in FIGS. 3 to 5, the first image and the second image are respectively displayed by first picture element columns 8-1 and second picture element columns 8-2 which are alternately provided along the row direction among a plurality of picture element columns 8. In the first preferred embodiment, the first picture element column 8-1 in FIG. 4 is the picture element column 8 belonging to an odd-numbered picture element column from the left among the plurality of picture element columns 8 in FIG. 3, and the second picture element column 8-2 in FIG. 5 is the picture element column 8 belonging to an even-numbered picture element column from the left among the plurality of picture element columns 8 in FIG. 3. The polarity arrangement in FIG. 3 corresponds to a polarity arrangement of one image mode, and the polarity arrangements in FIGS. 4 and 5 correspond to a polarity arrangement of two-image mode.

In the polarity arrangement of the frame shown in FIG. 3, the gate driver 9 and the source driver 10 apply a voltage to the picture elements 4 so that, when the plurality of picture element columns 8 are sequentially viewed along the row direction, a polarity of the voltage applied to the picture elements 4 of the same color is inverted for every two picture element columns 8. In addition, in the polarity arrangement of the frame shown in FIG. 3, the gate driver 9 and the source driver 10 apply a voltage to the picture elements 4 so that, when the plurality of picture element columns 8 are sequentially viewed along the column direction, a polarity of the voltage applied to the picture elements 4 of the same color is inverted for every one picture element column 8. In other words, the gate driver 9 and the source driver 10 apply a voltage having a polarity opposite to a polarity of a voltage applied to red, green, blue and white picture elements in one picture element column 8 to red, green, blue, and white picture elements 4 in another picture element column 8 adjacent to the one picture element column 8.

In the polarity arrangement of the frame shown in FIG. 4, the gate driver 9 and the source driver 10 apply a voltage to the picture elements 4 so that, when a plurality of first picture element columns 8-1 are sequentially viewed along the row direction, a polarity of the voltage applied to the picture elements 4 of the same color is inverted for every one first picture element column 8-1. In addition, the gate driver 9 and the source driver 10 apply a voltage to the picture elements 4 so that, when the plurality of first picture element columns 8-1 are sequentially viewed along the column direction, a polarity of the voltage applied to the picture elements 4 of the same color is inverted for every one first picture element column 8-1. In other words, the gate driver 9 and the source driver 10 apply a voltage having a polarity opposite to a polarity of the voltage applied to red, green, blue, and white picture elements in one first picture element column 8-1 to red, green, blue, and white picture elements 4 in another first picture element column 8-1 adjacent to the one first picture element column 8-1.

In the polarity arrangement of the frame shown in FIG. 5, the gate driver 9 and the source driver 10 apply a voltage to the picture elements 4 so that, when a plurality of second picture columns 8-2 are sequentially viewed along the row direction, a polarity of the voltage applied to the picture elements 4 of the same color is inverted for every one second picture element column 8-2. In addition, the gate driver 9 and the source driver 10 apply a voltage to the picture elements 4 so that, when the plurality of second picture element columns 8-2 are sequentially viewed along the column direction, a polarity of the voltage applied to the picture elements 4 of the same color is inverted for every one second picture element column 8-2. In other words, the gate driver 9 and the source driver 10 apply a voltage having a polarity opposite to a polarity of a voltage applied to red, green, blue, and white picture elements in one second picture element column 8-2 to red, green, blue, and white picture elements 4 in another second picture element column 8-2 adjacent to the one second picture element column 8-2.

As a result, in any of the polarity arrangements in FIGS. 3 to 5, not only the polarities of the red (R) and blue (B) picture elements but also the polarities of the white (W) and green (G) picture elements having high visibility and a noticeable flicker are equally dispersed. In other words, in an arbitrary frame, the polarities of the white (W), green (G), red (R), and blue (B) picture elements 4 in a horizontal direction, a vertical direction, and an oblique direction are as different as possible.

Figure 6:
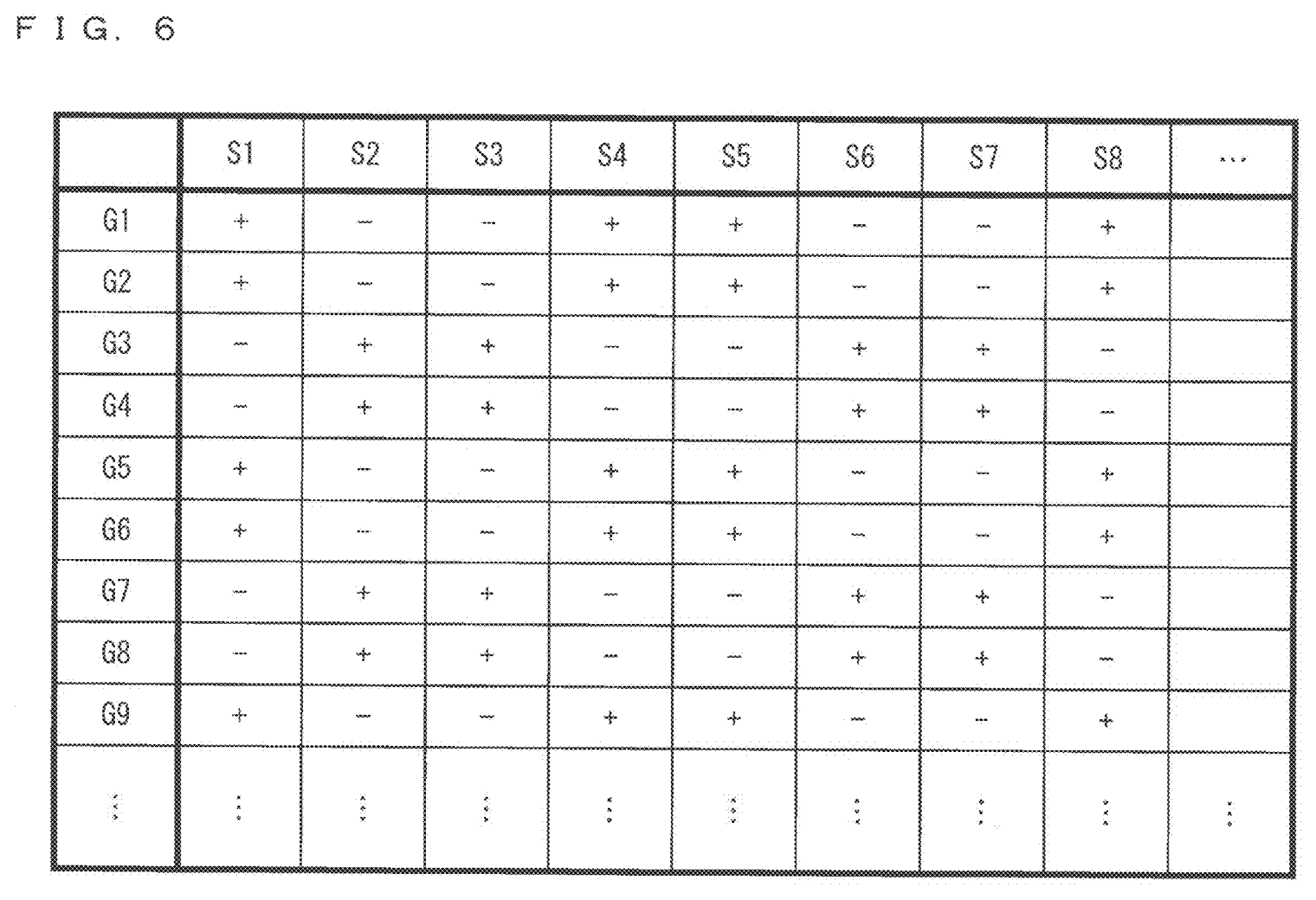

FIG. 6 is a diagram showing drive control of the gate driver 9 and the source driver 10 according to the first preferred embodiment for realizing the polarity arrangements shown in FIGS. 3 to 5. FIG. 6 shows polarity signals in a certain frame (denoted as a frame n). In the first preferred embodiment, the gate driver 9 selects the gate wiring line $G_n$ (for example, G1), $G_{n+1}$ (for example, G2), $G_{n+2}$ (for example, G3), $G_{n+3}$ (for example, G4), $G_{n+4}$ (for example, G5), $G_{n+5}$ (for example, G6), $G_{n+6}$ (for example, G7), $G_{n+7}$ (for example, G8), . . . in this order.

While the gate driver 9 turns on the gate wiring line $G_n$ (for example, G1) and turns off the gate wiring line $G_{n+1}$ (for example, G2), the source driver 10 applies a voltage having a first polarity to the source wiring line $S_m$ (for example, S1) and applies a voltage having a second polarity different from the first polarity to the source wiring line $S_{m+1}$ (for example, S2). Thereafter, while the gate driver 9 turns on the gate wiring line $G_{n+1}$ (for example, G2) and turns off the gate wiring line $G_n$ (for example, G1), the source driver 10 applies the voltage having the first polarity to the source wiring line $S_m$ (for example, S1) and applies the voltage having the second polarity to the source wiring line $S_{m+1}$ (for example, S2).

In the first preferred embodiment, in response to selection of the gate wiring line $G_n$ (for example, G1), $G_{n+1}$ (for example, G2), $G_{n+2}$ (for example, G3), $G_{n+3}$ (for example, G4), $G_{n+4}$ (for example, G5), $G_{n+5}$ (for example, G6), $G_{n+6}$ (for example, G7), $G_{n+7}$ (for example, G8), the source driver 10 outputs polarity signals of "+"→"+"→"−"→"−"→"+"→"+"→"−"→"−" in this order from the source wiring line $S_m$ (for example, S1). In this manner, the source driver 10 performs two-row inversion driving. The source driver 10 repeatedly outputs the polarity signals in the above-mentioned order also for selection of the gate wiring lines thereafter.

In response to the selection of the gate wiring lines $G_n$ to $G_{n+7}$, the source driver 10 outputs polarity signals of "−"→"−"→"+"→"+"→"−"→"−"→"+"→"+" in this order from the source wiring line $S_{m+1}$ (for example, S2). The source driver 10 repeatedly outputs the polarity signals in the above-mentioned order also for selection of the gate wiring lines thereafter.

The source driver 10 outputs the same polarity signals as the polarity signals of the source wiring line $S_{m+1}$ from the source wiring line $S_{m+2}$ (for example, S3). The source driver 10 outputs the same polarity signals as the polarity signals of the source wiring line $S_m$ from the source wiring line $S_{m+3}$ (for example, S4). The source driver 10 outputs the same polarity signals as the polarity signals of the source wiring line $S_m$ to the source wiring line $S_{m+3}$ from the source wiring line $S_{m+4}$ (for example, S5) to the source wiring line $S_{m+7}$ (for example, S8).

As shown in FIG. 2, in the third and fourth picture element columns from the left, unlike the first and second picture element columns, the right source wiring line 7b of the picture element 4 is connected to the TFT 5 of the picture element 4 belonging to the odd-numbered picture element row, and the left source wiring line 7a of the picture element 4 is connected to the TFT 5 of the picture element 4 belonging to the even-numbered picture element row. For this reason, the polarities of the voltages applied to, for example, S1 to S4 are the same as the polarities of the voltages applied to, for example, S5 to S8, but the polarities of the picture elements 4 in the first column and the polarities of the picture elements 4 in the third column are mutually inverted, and the polarities of the picture elements 4 in the second column and the polarities of picture elements 4 in the fourth column are mutually inverted.

Accordingly, the polarities of the plurality of first picture elements 4 from the top in FIG. 3 are represented by a repetition of "+", "−", "−", "+", "+", "−", "−", "+", . . . in this order from the leftmost side. In the next frame (frame n+1), the polarities are inverted, and the polarities of the plurality of second picture elements 4 from the top in FIG. 3 are represented by a repetition of "−", "+", "+", "−", "−", "+", "+", "−", . . . in this order from the leftmost side.

Gist of First Preferred Embodiment

In accordance with the liquid crystal display device 1 according to the first preferred embodiment as described above, the gate driver 9 and the source driver 10 apply a voltage having a polarity opposite to a polarity of a voltage applied to the red, green, blue, and white picture elements in one first picture element column 8-1 to the red, green, blue, and white picture elements 4 in another first picture element column 8-1 adjacent to the one first picture element column 8-1. Further, the gate driver 9 and the source driver 10 apply a voltage having a polarity opposite to a polarity of a voltage applied to the red, green, blue, and white picture elements in one second picture element column 8-2 to the red, green, blue, and white picture elements 4 in another second picture element column 8-2 adjacent to the one second picture element column 8-2. According to such a configuration, in any of the polarity arrangements in FIGS. 3 to 5, since the polarities of the picture elements 4 of each color are equally dispersed, occurrence of a flicker can be suppressed. In addition, since the polarities of the voltages applied to the picture elements 4 of the same color do not all become the same in the pixel row (=2 picture element rows) to be simultaneously written, occurrence of a lateral shadow can be suppressed. Accordingly, it is possible to enhance display quality in the liquid crystal display device 1 capable of displaying the first image and the second image in parallel.

Second Preferred Embodiment

Figure 7:
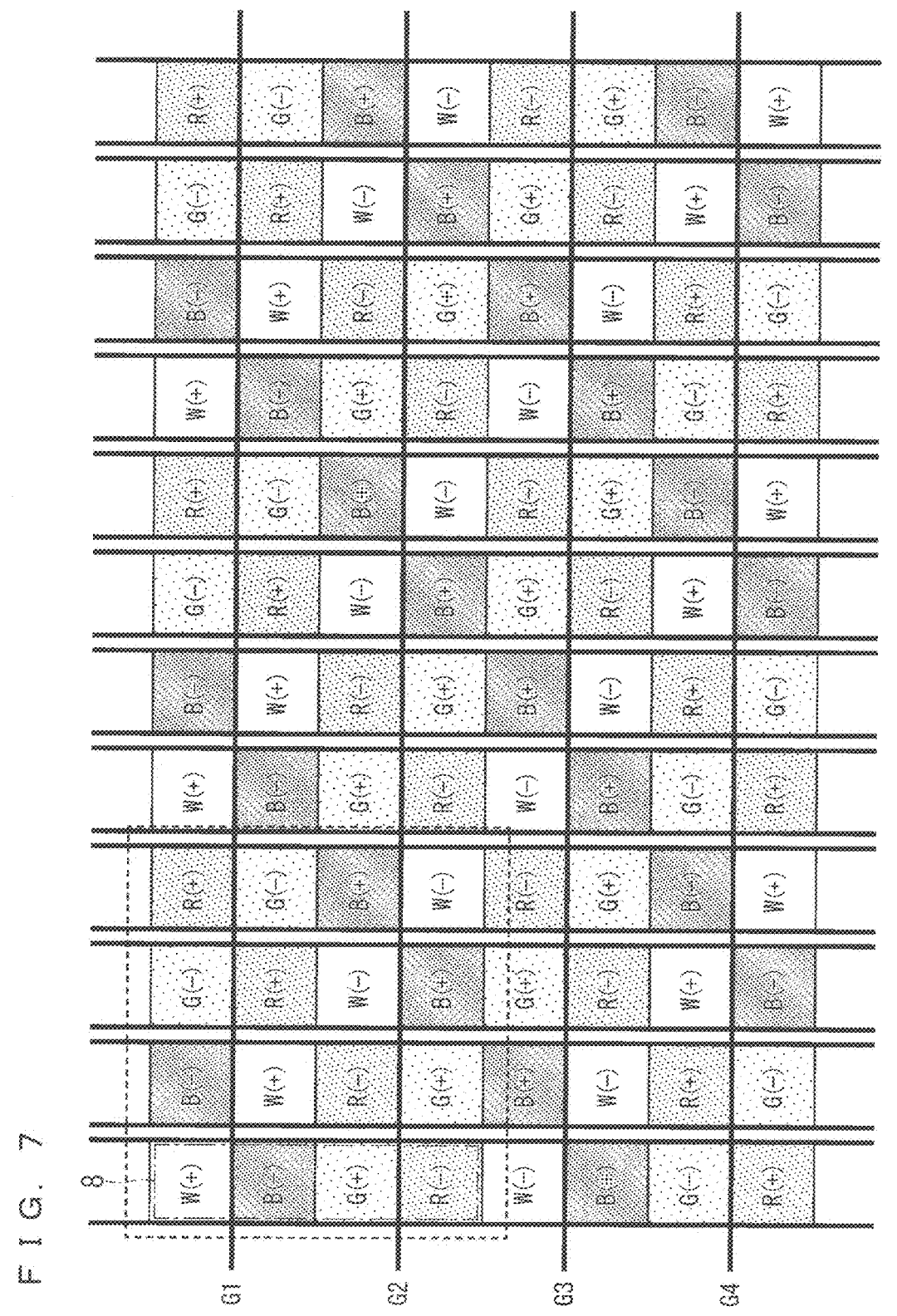
Figure 8:
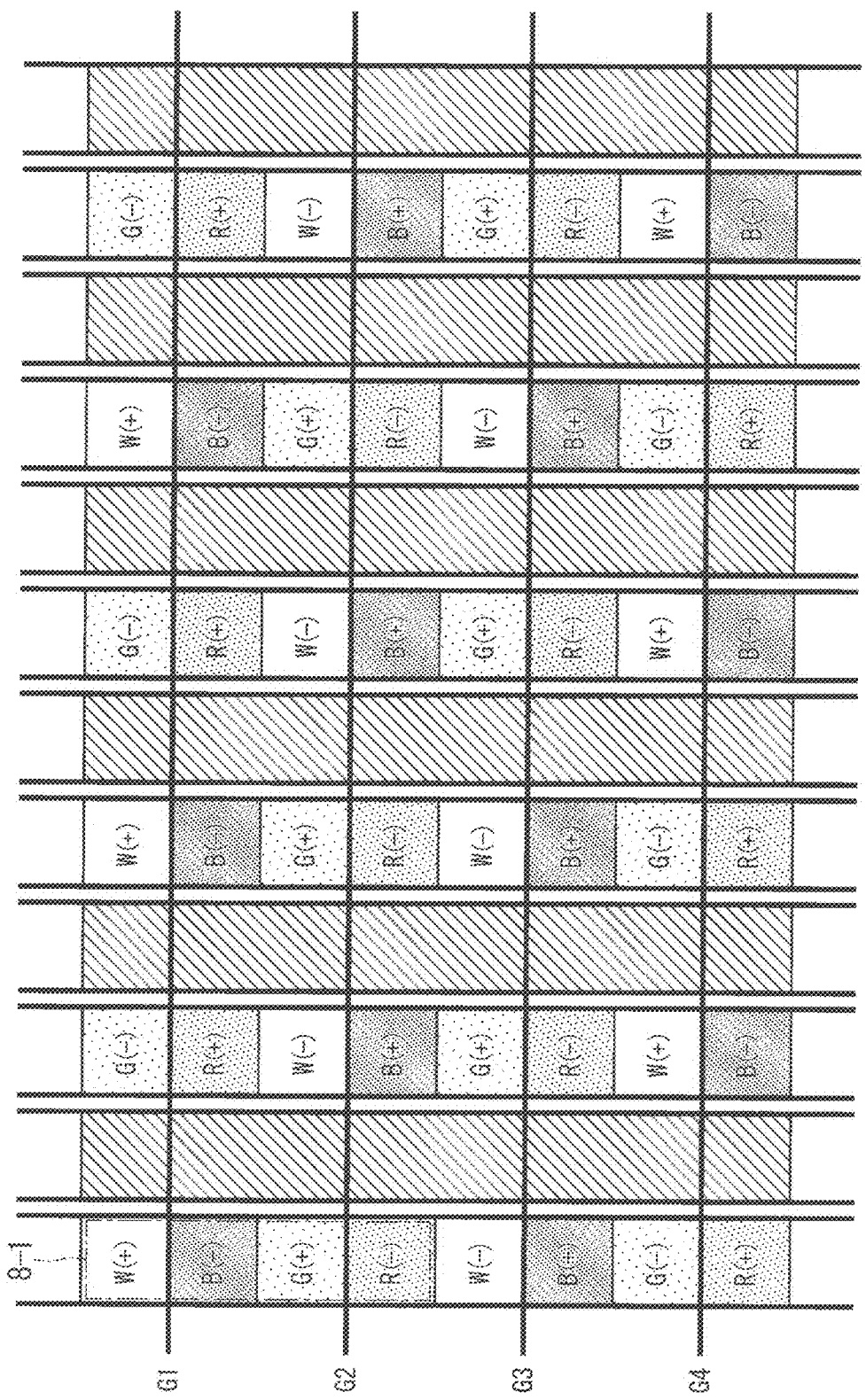
Figure 9:
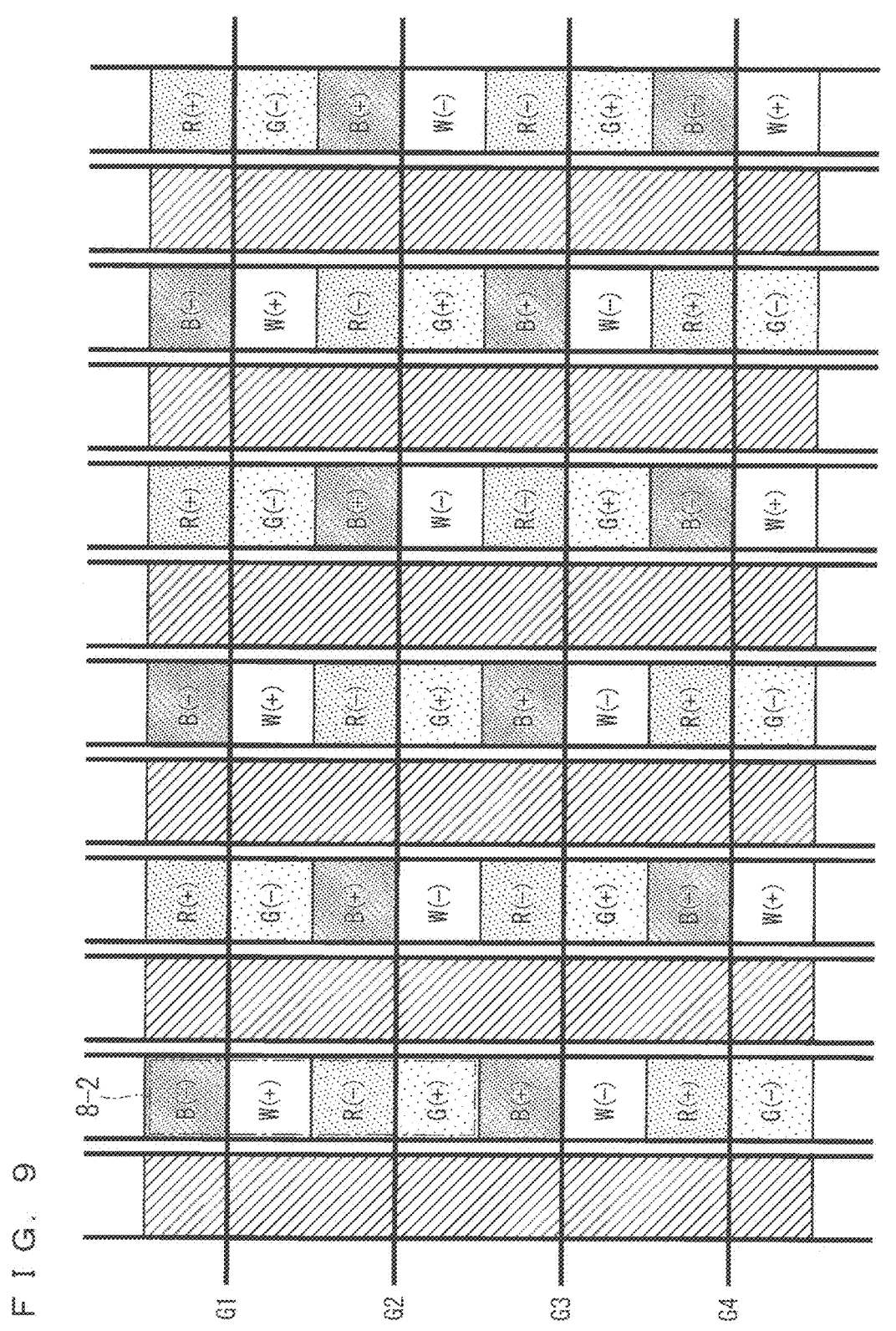

FIGS. 7, 8, and 9 are diagrams each showing a polarity arrangement in a certain frame of a liquid crystal panel 2 according to a second preferred embodiment of the present invention, similarly to FIGS. 3, 4, and 5. FIG. 7 shows picture elements 4 for 8 picture element rows×12 picture element columns obtained by repeating picture elements 4 of 4 picture element rows×4 picture element columns surrounded by a broken line square. The arrangement of picture elements 4 in FIG. 7 is different from the arrangement of picture elements 4 in FIG. 3 described in the first preferred embodiment.

Specifically, in the arrangement in FIG. 3, the green and white picture elements 4 are each arranged in the tilt direction which is the direction from the lower left to the upper right, and the red and blue picture elements 4 are each arranged in the tilt direction which is the direction from the lower right to the upper left. On the other hand, in the arrangement in FIG. 7, green and white picture elements 4 are each arranged in a tilt direction which is a direction from the lower right to the upper left, and red and blue picture elements 4 are each arranged in a tilt direction which is a direction from the lower left to the upper right.

Gist of Second Preferred Embodiment

In accordance with a liquid crystal display device 1 according to the second preferred embodiment as described above, since polarities of the picture elements 4 of each color are equally dispersed in any of the polarity arrangements in FIGS. 7 to 9, occurrence of a flicker can be suppressed similarly to the first preferred embodiment. Also, since the polarities of white (W) and green (G) with high visibility are different, occurrence of a lateral shadow can be reduced. Accordingly, it is possible to enhance display quality in the liquid crystal display device 1 capable of displaying the first image and the second image in parallel.

Third Preferred Embodiment

Figure 11:
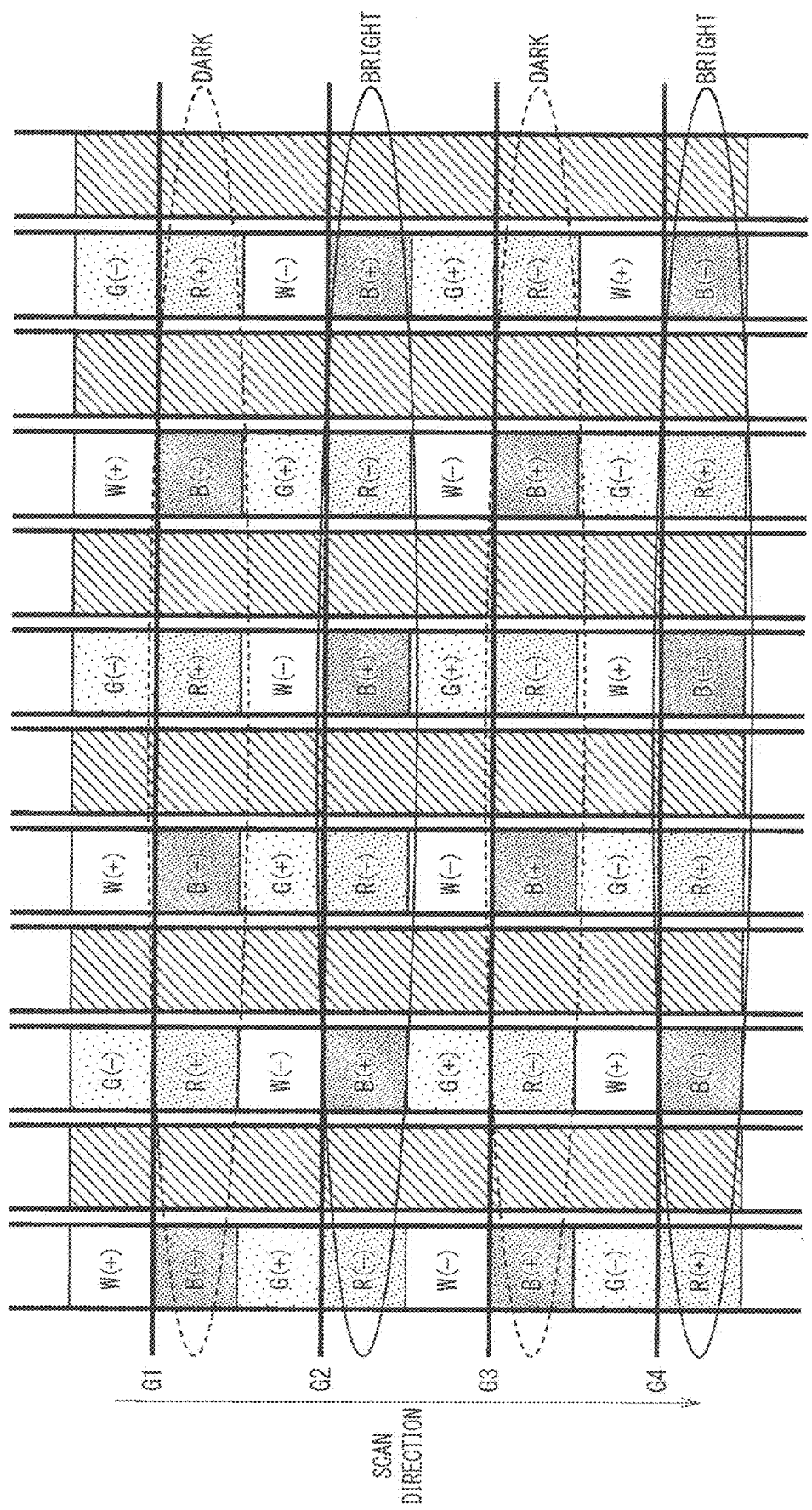
Figure 12:
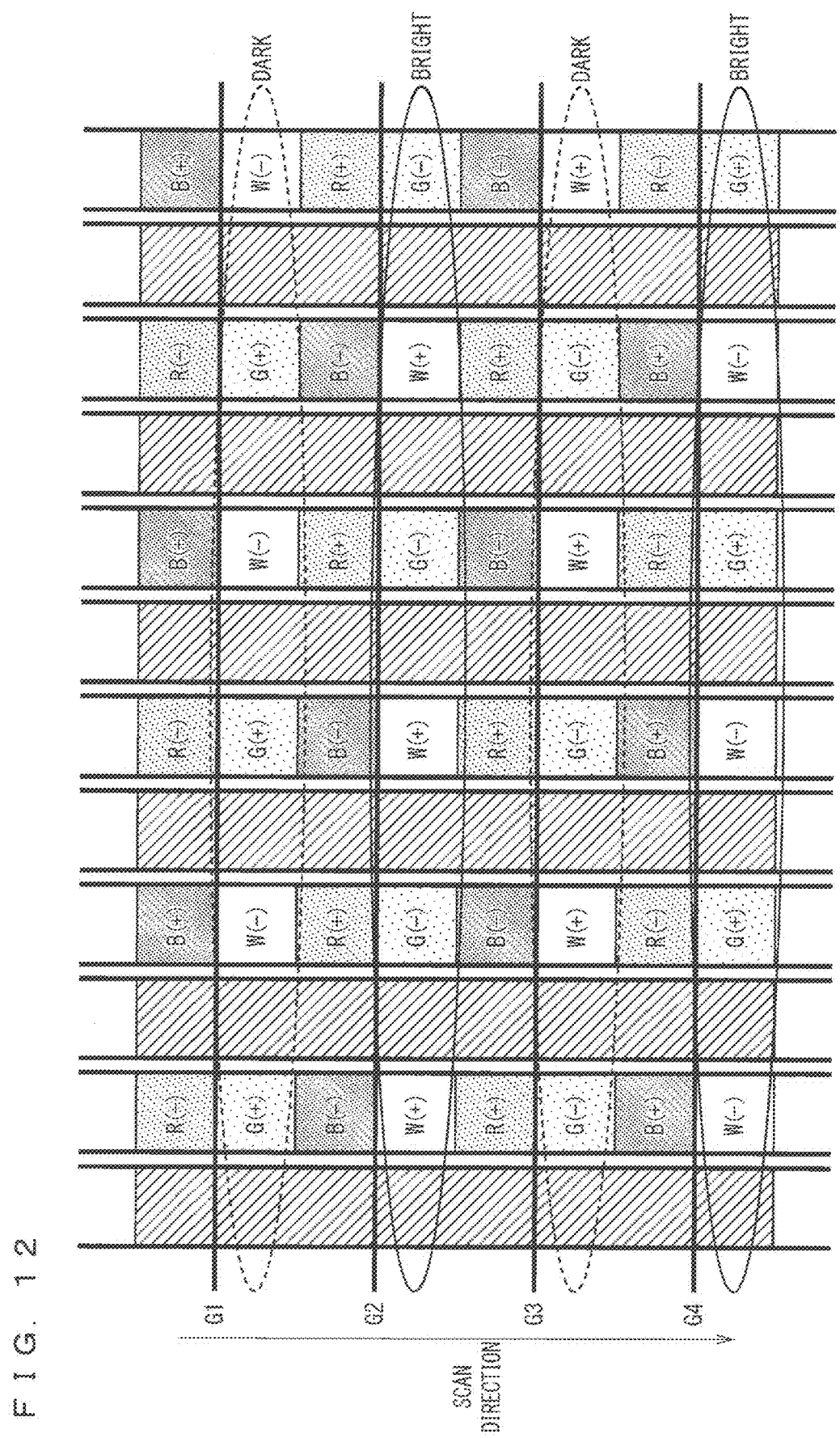

Prior to describing a liquid crystal display device 1 according to a third preferred embodiment of the present invention, a display of the liquid crystal display device 1 according to the first preferred embodiment will be described with reference to FIGS. 10, 11 and 12 corresponding to FIGS. 3, 4 and 5. In the following description, among two picture elements 4 in two vertical rows constituting one pixel 3, a picture element 4 provided on an upper side of a gate wiring line 6 in a plan view is sometimes referred to as "upper picture element 4", and a picture element 4 provided on a lower side of the gate wiring line 6 in the plan view is sometimes referred to as "lower picture element 4".

As in the first preferred embodiment, in the configuration in which one pixel 3 is formed by 4 picture elements 4 in 2 vertical rows×2 horizontal columns and the gate wiring line 6 is provided between the picture elements 4 in the 2 vertical rows, the lower picture element 4 of one gate wiring line 6 forms capacitance with the upper picture element 4 of another gate wiring line 6 adjacent to the one gate wiring line 6. Therefore, as shown in FIGS. 10 to 12, when a sequential scan, such as G1→G2→G3→G4→G5→ . . . , is performed, that is, the other gate wiring line 6 is scanned after the one gate wiring line 6, a potential of the lower picture element 4 of the one gate wiring line 6 may fluctuate in response to a potential fluctuation of the upper picture element 4 of the other gate wiring line 6.

Figure 10:
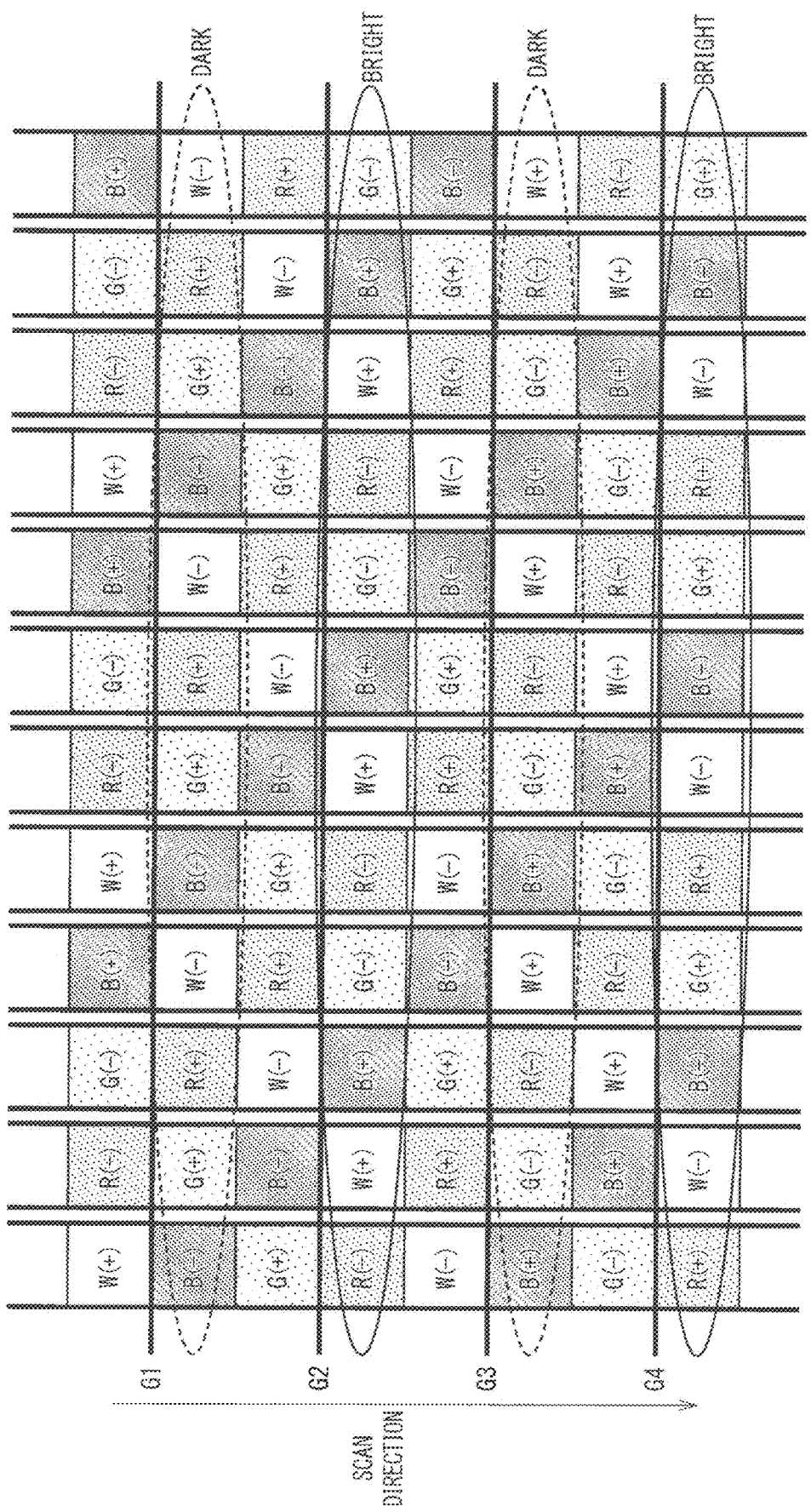
FIGS. 10, 11, and 12 are diagrams each showing a polarity arrangement of the liquid crystal display device according to the first preferred embodiment.

For example, in a certain frame, when potentials of "+" polarity and "−" polarity are respectively written in green (G) and white (W) picture elements 4 out of lower picture elements 4 of the gate wiring line G1 in FIG. 10, potentials of "+" polarity and "−" polarity have already been written in blue (B) and red (R) picture elements 4 out of upper picture elements 4 of the gate wiring line G2.

After writing is performed to pixels 3 connected to the gate wiring line G1 with the above polarities, writing is performed to pixels 3 connected to the gate wiring line G2 according to a scan order. As a result, potentials of "−" polarity and "+" polarity are respectively written in the blue (B) and red (R) picture elements 4 out of the upper picture elements 4 of the gate wiring line G2.

Since the polarity of the blue (B) upper picture element 4 is changed from "+" to "−" by the writing in the gate wiring line G2, the potential of the blue (B) upper picture element 4 decreases. Due to capacitance between adjacent pixels of the blue (B) upper picture element 4 of the gate wiring line G2 and the green (G) lower picture element 4 of the gate wiring line G1, the potential of "+" polarity written in the green (G) lower picture element 4 decreases as the potential of the blue (B) upper picture element 4 decreases. In the liquid crystal display device in a normally black mode, when an absolute value of the potential of "+" polarity of the green (G) lower picture element 4 of the gate wiring line G1 becomes smaller due to the above phenomenon, luminance decreases and becomes darker than designed luminance.

On the other hand, since the polarity of the red (R) upper picture element 4 is changed from "−" to "+" by the above writing in the gate wiring line G2, the potential of the red (R) upper picture element 4 rises. Due to capacitance between adjacent pixels of the red (R) upper picture element 4 of the gate wiring line G2 and the white (W) lower picture element 4 of the gate wiring line G1, the potential of "−" polarity written in the white (W) lower picture element 4 rises as the potential of the red (R) upper picture element 4 rises. In the liquid crystal display device in the normally black mode, when an absolute value of the potential of "−" polarity of the white (W) lower picture element 4 of the gate wiring line G1 becomes smaller due to the above phenomenon, luminance decreases and becomes darker than designed luminance.

Also, there may be a phenomenon opposite to the above phenomenon. For example, in a certain frame, when potentials of "−" polarity and "+" polarity are respectively written in green (G) and white (W) picture elements 4 out of lower picture elements 4 of the gate wiring line G2 in FIG. 10, potentials of "+" polarity and "−" polarity have already been written in blue (B) and red (R) picture elements 4 out of upper picture elements 4 of the gate wiring line G3.

After writing is performed to the pixels 3 connected to the gate wiring line G2 with the above polarities, writing is performed to pixels 3 connected to the gate wiring line G3 according to a scan order. As a result, potentials of "−" polarity and "+" polarity are respectively written in the blue (B) and red (R) picture elements 4 out of the upper picture elements 4 of the gate wiring line G3.

Since the polarity of the blue (B) upper picture element 4 is changed from "+" to "−" by the writing in the gate wiring line G3, the potential of the blue (B) upper picture element 4 decreases. Due to capacitance between adjacent pixels of the blue (B) upper picture element 4 of the gate wiring line G3 and the green (G) lower picture element 4 of the gate wiring line G2, the potential of "−" polarity written in the green (G) lower picture element 4 decreases as the potential of the blue (B) upper picture element 4 decreases. In the liquid crystal display device in the normally black mode, when an absolute value of the potential of "−" polarity of the green (G) lower picture element 4 of the gate wiring line G2 becomes larger due to the above phenomenon, luminance rises and becomes brighter than designed luminance.

On the other hand, since the polarity of the red (R) upper picture element 4 is changed from "−" to "+" by the above writing in the gate wiring line G3, the potential of the red (R) upper picture element 4 rises. Due to capacitance between adjacent pixels of the red (R) upper picture element 4 of the gate wiring line G3 and the white (W) lower picture element 4 of the gate wiring line G2, the potential of "+" polarity written in the white (W) lower picture element 4 rises as the potential of the red (R) upper picture element 4 rises. In the liquid crystal display device in the normally black mode, when an absolute value of the potential of "+" polarity of the white (W) lower picture element 4 of the gate wiring line G2 becomes larger due to the above phenomenon, luminance rises and becomes brighter than designed luminance.

Luminance of blue (B) and red (R) lower picture elements 4 also fluctuates in the same way as the luminance of the above-mentioned green (G) and white (W) lower picture elements 4. However, blue (B) and red (R) have lower visibility than white (W) and green (G). Therefore, as shown in FIG. 11, the luminance fluctuations described above are difficult to be visually recognized in the first image in which the white (W) and green (G) picture elements 4 with high visibility are the upper picture elements 4 and the blue (B) and red (R) picture elements 4 with low visibility are the lower picture elements 4. However, as shown in FIG. 12, the luminance fluctuations described above may be visually recognized in the second image in which the white (W) and green (G) picture elements 4 with high visibility are the lower picture elements 4 and the blue (B) and red (R) picture elements 4 with low visibility are the upper picture elements 4. In other words, brightness and darkness appearing in each pixel row may be visually recognized in the second image.

In the third preferred embodiment, in order to solve such a problem, a scan order of the gate wiring lines 6 is changed from the scan order in the first preferred embodiment.

Figure 13:
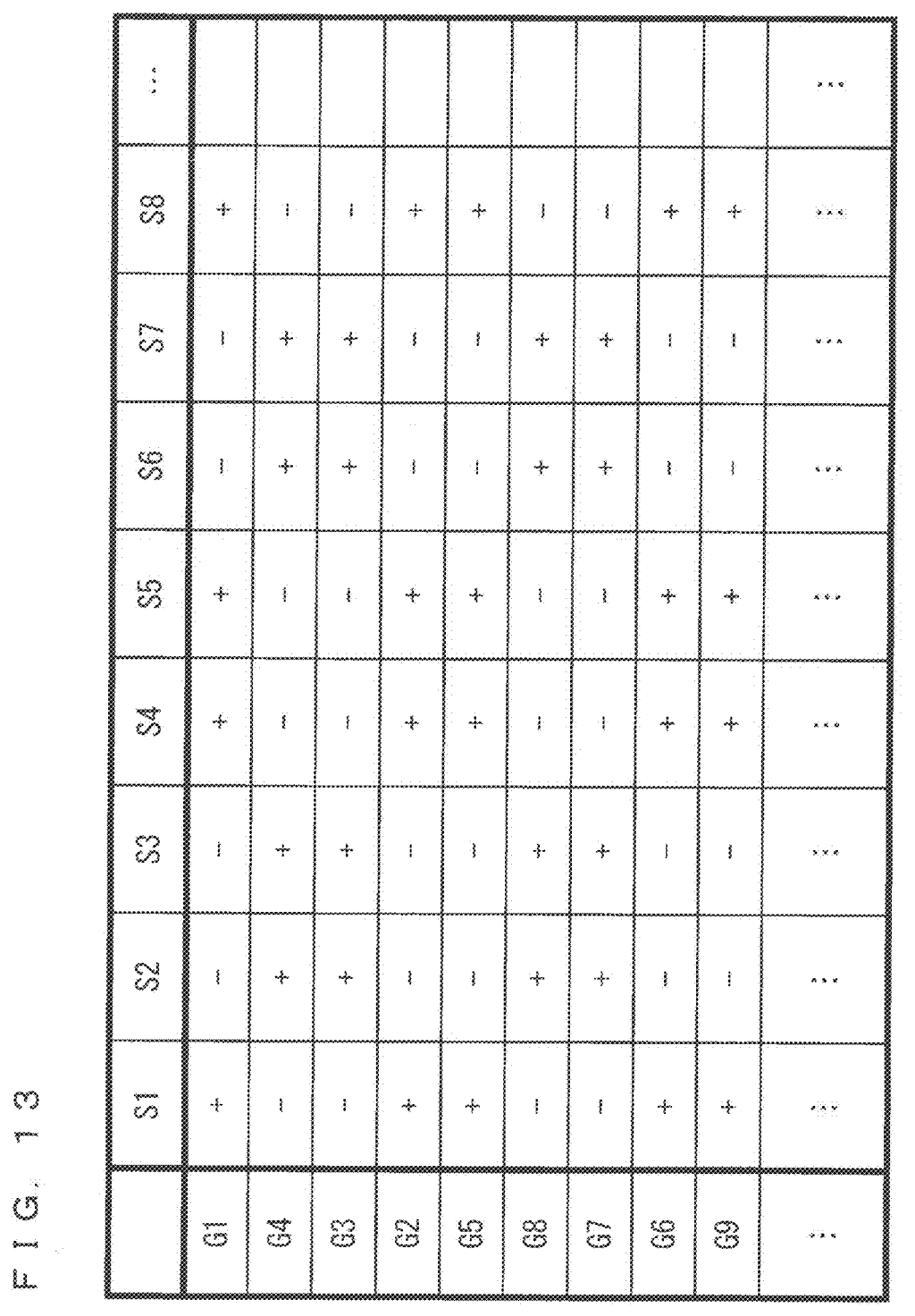

FIG. 13 is a diagram showing drive control of a gate driver 9 and a source driver 10 according to the third preferred embodiment.

The gate scan order (FIG. 6) in the first preferred embodiment is "G1"→"G2"→"G3"→"G4"→"G5"→"G6"→"G7"→"G8"→.... On the other hand, as shown in FIG. 13, the gate scan order in the third preferred embodiment is "G1"→"G4"→"G3"→"G2"→"G5"→"G8"→"G7"→"G6"→.... Further, in the third preferred embodiment, a source polarity arrangement shown in FIG. 13 is also changed from the source polarity arrangement shown in FIG. 6 in the first preferred embodiment in correspondence with the change in the gate scan order from the gate scan order in the first embodiment.

Also, in the third preferred embodiment, while the gate driver 9 turns on only a gate wiring line $G_n$ (for example, G1) out of gate wiring lines $G_n$ (for example, G1) to $G_{n+3}$ (for example, G4), the source driver 10 applies a voltage having a first polarity to a source wiring line $S_m$ (for example, S1), and applies a voltage having a second polarity different from the first polarity to the source wiring line $S_{m+1}$ (for example, S2).

Thereafter, while the gate driver 9 turns on only the gate wiring line $G_{n+3}$ (for example, G4) out of the gate wiring lines $G_n$ (for example, G1) to $G_{n+3}$ (for example, G4), the source driver 10 applies the voltage having the second polarity to the source wiring line $S_m$ (for example, S1), and applies the voltage having the first polarity to the source wiring line $S_{m+1}$ (for example, S2).

Thereafter, while the gate driver 9 turns on only the gate wiring line $G_{n+2}$ (for example, G3) out of the gate wiring lines $G_n$ (for example, G1) to $G_{n+3}$ (for example, G4), the source driver 10 applies the voltage having the second polarity to the source wiring line $S_m$ (for example, S1), and applies the voltage having the first polarity to the source wiring line $S_{m+1}$ (for example, S2).

Thereafter, while the gate driver 9 turns on only the gate wiring line $G_{n+1}$ (for example, G2) out of the gate wiring lines $G_n$ (for example, G1) to $G_{n+3}$ (for example, G4), the source driver 10 applies the voltage having the first polarity to the source wiring line $S_m$ (for example, S1), and applies the voltage having the second polarity to the source wiring line $S_{m+1}$ (for example, S2). Thereafter, the source driver 10 repeatedly outputs the polarity signals in the above order also for selection of gate wiring lines thereafter.

Figure 16:
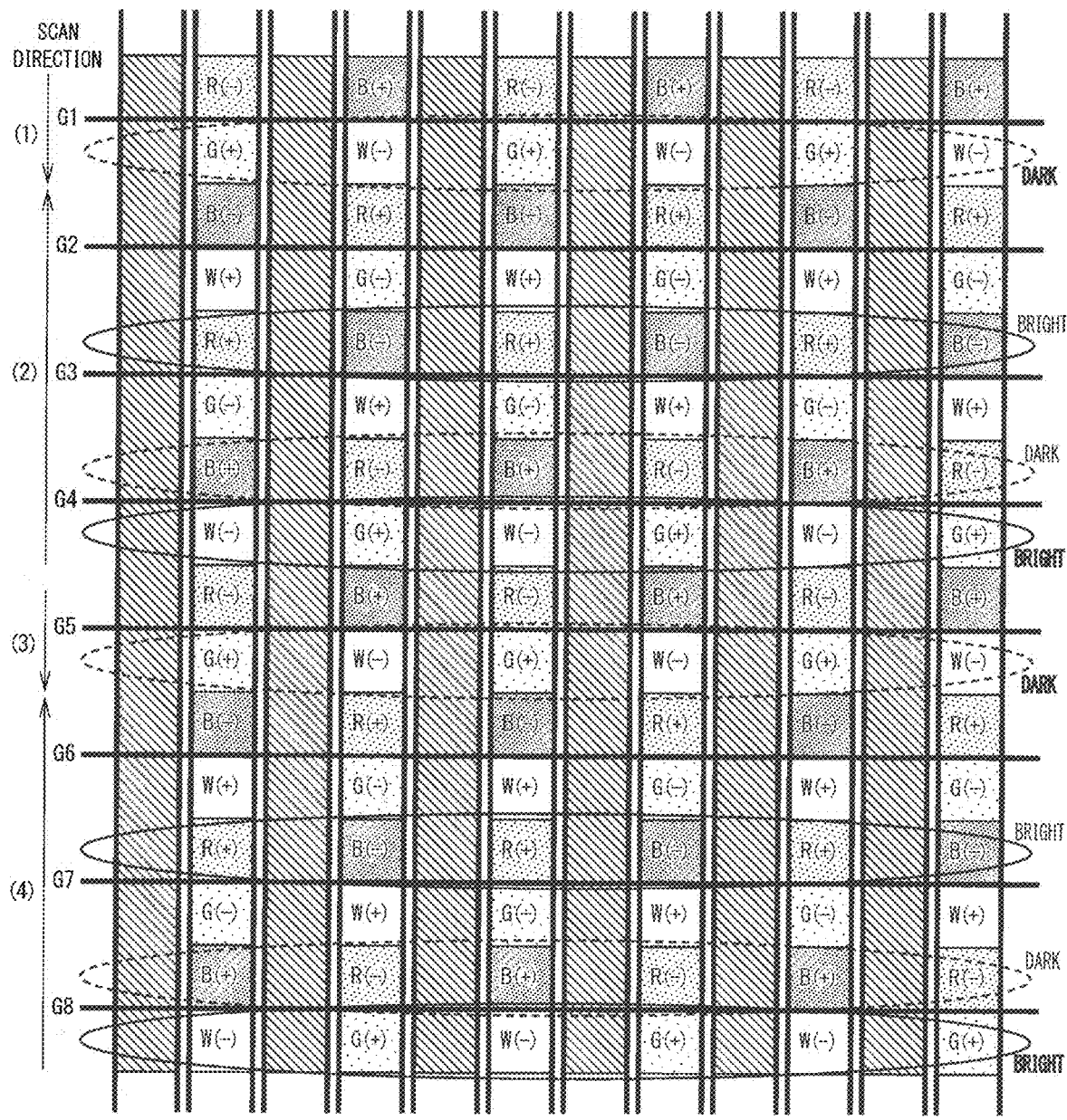

FIGS. 14, 15, and 16 are diagrams each showing a polarity arrangement in a certain frame of a liquid crystal panel 2 according to the third preferred embodiment, similarly to FIGS. 3, 4, and 5. As shown in FIGS. 14 to 16, not only brightness and darkness of blue (B) and red (R) with low visibility but also brightness and darkness of green (G) and white (W) with high visibility appears equally in a first image and a second image.

Gist of Third Preferred Embodiment

According to the liquid crystal display device 1 of the third preferred embodiment as described above, since the brightness and darkness of each color can be dispersed in the first image and the second image, it is possible to enhance display quality when three-dimensional display is performed.

Fourth Preferred Embodiment

Figure 17:
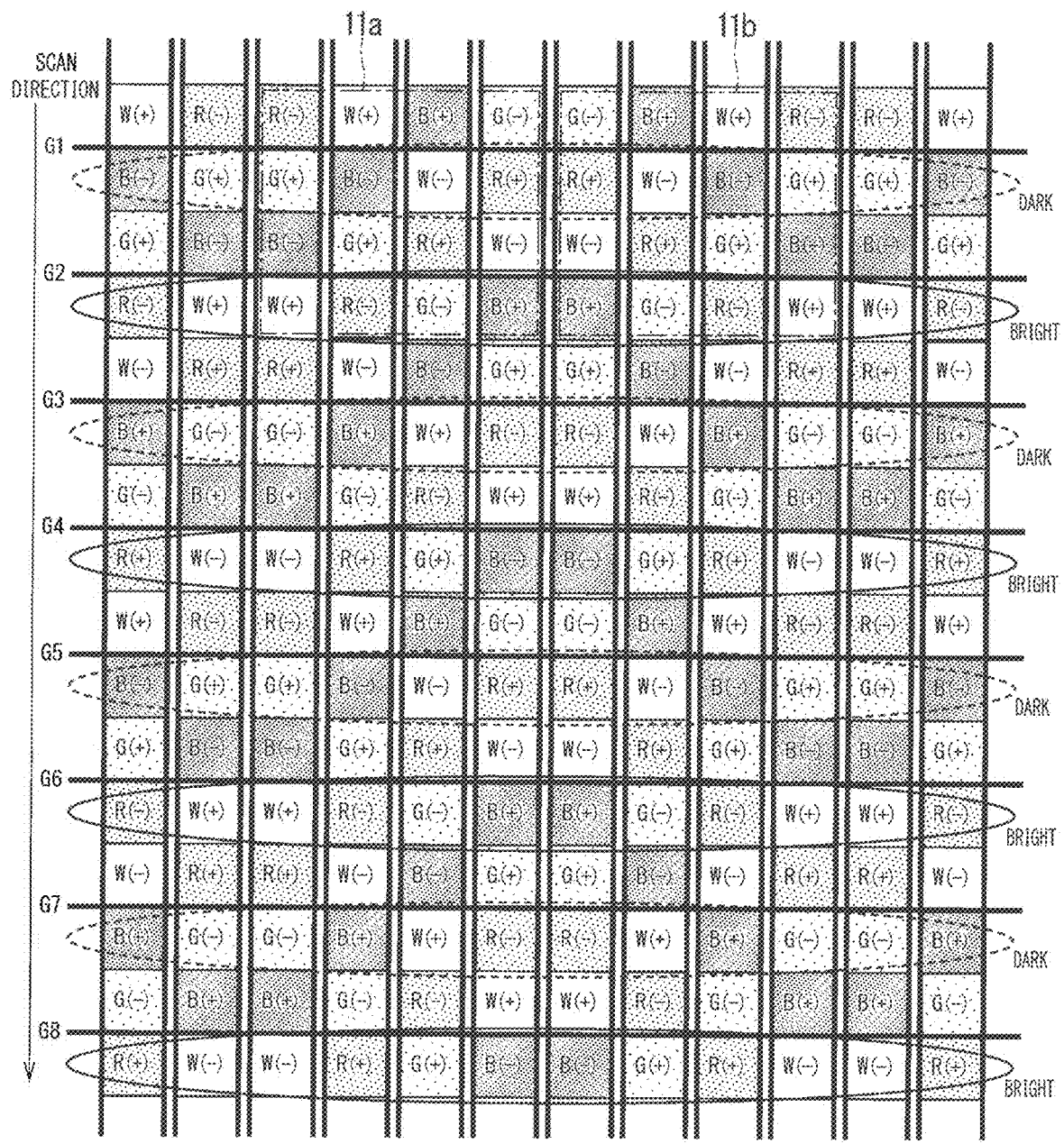
Figure 18:
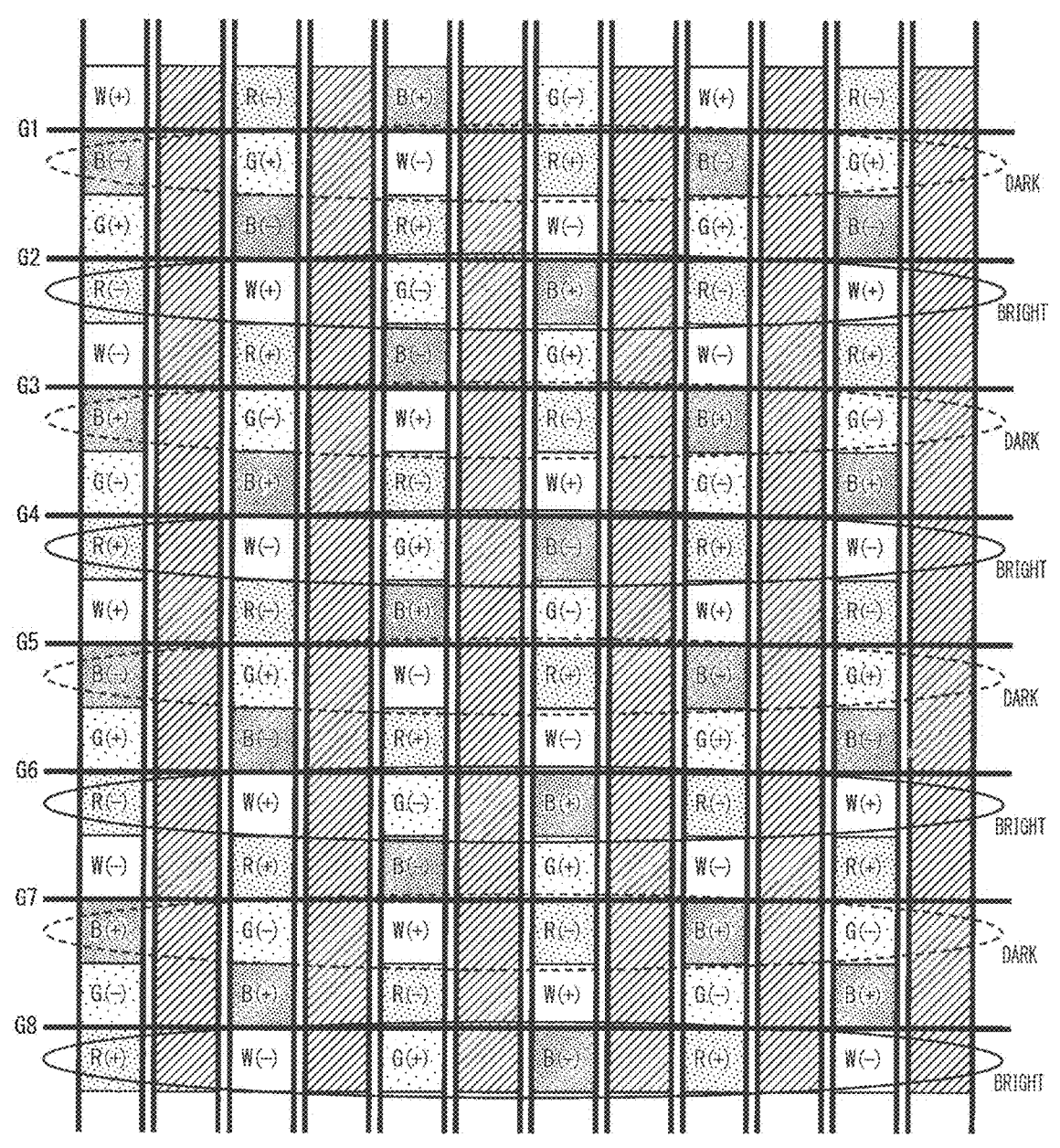
Figure 19:
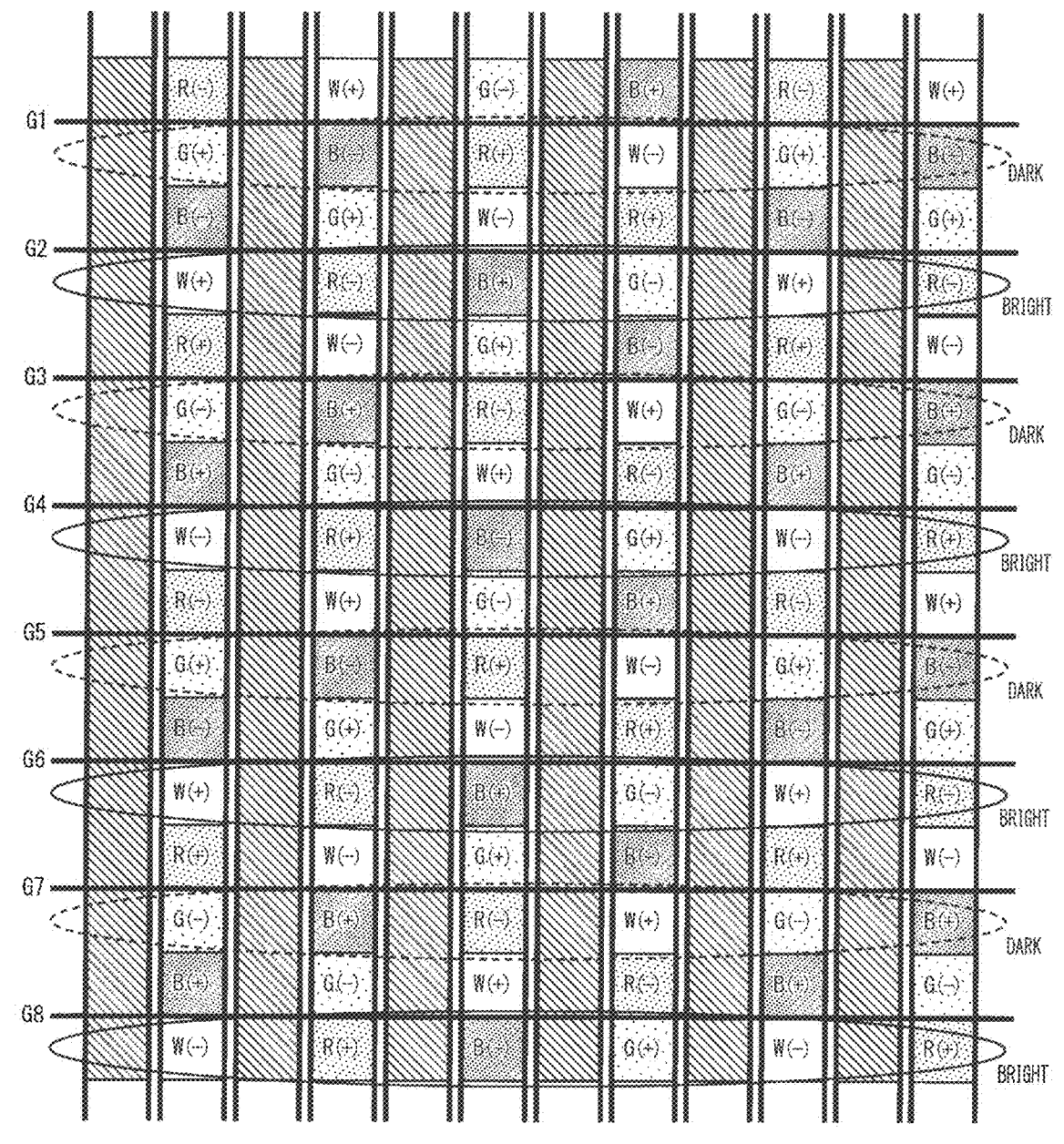

FIGS. 17, 18, and 19 are diagrams each showing a polarity arrangement in a certain frame of a liquid crystal panel 2 according to a fourth preferred embodiment of the present invention, similarly to FIGS. 3, 4, and 5.

Regarding the problem described in the third preferred embodiment, in the fourth preferred embodiment, the picture element arrangements in the first to third preferred embodiments are changed. Specifically, in the first to third preferred embodiments, the pixels 3 in a matrix form of 2×2, that is, the picture elements 4 of 4 picture element rows×4 picture element columns which are the picture elements 4 in a matrix form of 4×4, are used as a unit and repeatedly arranged. Also, in the 4×4 matrix, the green and white picture elements 4 are each arranged in the first tilt direction, and the red and blue picture elements 4 are each arranged in the second tilt direction different from the first tilt direction.

On the other hand, in the fourth preferred embodiment, pixels 3 in a matrix form of 2×4, that is, picture elements 4 in a matrix form of 4×8, are used as a unit and repeatedly arranged. The picture elements 4 in the matrix form of 4×8 includes a first picture element matrix 11a and a second picture element matrix 11b each indicated by one-dot chain lines in FIG. 17 and each formed by arranging red, green, blue and white picture elements 4 in a plurality of picture element columns in a matrix form of 4×4.

The green and white picture elements 4 in the first picture element matrix 11a are arranged in a first tilt direction which is a direction from the lower right to the upper left, and the red and blue picture elements 4 in the first picture element matrix 11a are arranged in a second tilt direction which is a direction from the lower left to the upper right. On the other hand, the second picture element matrix 11b is adjacent to the first picture element matrix 11a in a row direction and is line-symmetrical with the first picture element matrix 11a in a column direction.

As in the gate scan order in the first preferred embodiment, a gate scan order is "G1"→"G2"→"G3"→"G4"→"G5"→"G6"→"G7"→"G8"→ . . . . As shown in FIGS. 17 to 19, not only brightness and darkness of blue (B) and red (R) with low visibility but also brightness and darkness of green (G) and white (W) with high visibility appears equally in a first image and a second image.

Gist of Fourth Preferred Embodiment

According to a liquid crystal display device 1 of the fourth preferred embodiment as described above, since the brightness and darkness of each color can be dispersed in the first image and the second image, it is possible to enhance display quality when three-dimensional display is performed. In addition, since all of green (G) and white (W) having high visibility are not arranged in the same tilt direction with respect to the pixel arrangements in the first and second preferred embodiments, lines in the tilt direction can be prevented from being emphasized and visually recognized.

Note that, in the present invention, the preferred embodiments can be appropriately changed or omitted within a scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display device capable of displaying a first image and a second image in parallel, the display device comprising:
   a display panel in which a plurality of picture element columns are arranged in a column direction and a row direction, respectively, the plurality of picture element columns each including red, green, blue and white picture elements arranged one by one in the column direction; and
   drivers for applying a voltage to the display panel, wherein
   the first image and the second image are respectively displayed by first picture element columns and second picture element columns provided alternately along the row direction among the plurality of picture element columns, the first image being different from the second image, the first image and the second image being viewed at a same time by a user to produce a three-dimensional image,
   the drivers
      for each first picture element column, apply a voltage that has a polarity that is opposite to a polarity of the voltage applied to adjacent first picture element columns, and
      for each second picture element column, apply a voltage that has a polarity that is opposite to a polarity of the voltage applied to adjacent second picture element columns, and
      when the drivers sequentially apply the voltages in a scan direction that is parallel to the column direction, picture elements, which are adjacent in the column direction without a gate line interposed therebetween, form a capacitance with one another.

2. The display device according to claim 1, wherein
   one of the picture element columns includes a first picture element, a second picture element, a third picture element, and a fourth picture element which are each any of red, green, blue, and white picture elements and are sequentially arranged in a forward direction of the column direction,
   the first picture element and the second picture element are connected to a first gate wiring line, the third picture element and the fourth picture element are connected to a second gate wiring line, the first picture element and the third picture element are connected to a first source wiring line, and the second picture element and the fourth picture element are connected to a second source wiring line.

3. The display device according to claim 1, wherein
   the green and white picture elements in the plurality of picture element columns are arranged in a first tilt direction, and
   the red and blue picture elements in the plurality of picture element columns are arranged in a second tilt direction different from the first tilt direction.

4. The display device according to claim 1, wherein
   a first picture element matrix and a second picture element matrix in which the red, green, blue and white picture elements in the plurality of picture element columns are arranged in a matrix form of 4×4 are defined,
   the green and white picture elements in the first picture element matrix are arranged in a first tilt direction,
   the red and blue picture elements in the first picture element matrix are arranged in a second tilt direction different from the first tilt direction, and
   the second picture element matrix is adjacent to the first picture element matrix in the row direction and is symmetrical with the first picture element matrix in the column direction.

5. The display device according to claim 2, wherein
   the drivers
      apply a voltage having a first polarity to the first source wiring line and apply a voltage having a second polarity different from the first polarity to the second source wiring line while turning on the first gate wiring line and turning off the second gate wiring line, and
      thereafter, apply the voltage having the first polarity to the first source wiring line and apply the voltage having the second polarity to the second source wiring line while turning on the second gate wiring line and turning off the first gate wiring line.

6. A display device capable of displaying a first image and a second image in parallel, the display device comprising:
   a display panel in which a plurality of picture element columns are arranged in a column direction and a row direction, respectively, the plurality of picture element columns each including red, green, blue and white picture elements arranged one by one in the column direction; and
   drivers for applying a voltage to the display panel, wherein
   the first image and the second image are respectively displayed by first picture element columns and second picture element columns provided alternately along the row direction among the plurality of picture element columns,
   the drivers
      apply a voltage having a polarity opposite to a polarity of a voltage applied to red, green, blue, and white picture elements in one of the first picture element columns to red, green, blue, and white picture elements in another of the first picture element columns adjacent to the one of the first picture element columns, and apply a voltage having a polarity opposite to a polarity of a voltage applied to red, green, blue, and white picture elements in one of the second picture element columns to red, green, blue, and white picture elements in another of the second picture element columns adjacent to the one of the second picture element columns, one of the picture element columns includes a first picture element, a second picture element, a third picture element, and a fourth picture element which are each any of red, green, blue, and white picture elements and are sequentially arranged in a forward direction of the column direction, the first picture element and the second picture element are connected to a first gate wiring line, the third picture element and the fourth picture element are connected to a second gate wiring line, the first picture element and the third picture element are connected to a first source wiring line, and the second picture element and the fourth picture element are connected to a second source wiring line, the drivers apply a voltage having a first polarity to the first source wiring line and apply a voltage having a second polarity different from the first polarity to the second source wiring line while turning on the first gate wiring line and turning off the second gate wiring line, and thereafter, apply the voltage having the first polarity to the first source wiring line and apply the voltage having the second polarity to the second source wiring line while turning on the second gate wiring line and turning off the first gate wiring line, another of the picture element columns adjacent to the one of the picture element columns in the column direction includes a fifth picture element, a sixth picture element, a seventh picture element, and an eighth picture element which are each any of red, green, blue, and white picture elements and are sequentially arranged in the forward direction of the column direction, the fifth picture element and the sixth picture element are connected to a third gate wiring line, the seventh picture element and the eighth picture element are connected to a fourth gate wiring line, the fifth picture element and the seventh picture element are connected to the first source wiring line, the sixth picture element and the eighth picture element are connected to the second source wiring line, and the drivers apply the voltage having the first polarity to the first source wiring line and apply the voltage having the second polarity to the second source wiring line while turning on only the first gate wiring line out of the first to fourth gate wiring lines, thereafter, apply the voltage having the second polarity to the first source wiring line and apply the voltage having the first polarity to the second source wiring line while turning on only the fourth gate wiring line out of the first to fourth gate wiring lines, thereafter, apply the voltage having the second polarity to the first source wiring line and apply the voltage having the first polarity to the second source wiring line while turning on only the third gate wiring line out of the first to fourth gate wiring lines, and thereafter, apply the voltage having the first polarity to the first source wiring line and apply the voltage having the second polarity to the second source wiring line while turning on only the second gate wiring line out of the first to fourth gate wiring lines.

7. The display device according to claim 1, wherein picture elements adjacent in a column direction of each of the first picture element adjacent in a column direction mutually have the same polarity, and picture elements adjacent in a column direction of each of the second picture element adjacent in a column direction mutually have the same polarity.

8. The display device according to claim 1, wherein the plurality of picture elements are arranged such that at least some picture elements that are directly adjacent in a diagonal direction, which is different from each of the column direction and the row direction, are a same color.

9. The display device according to claim 1, wherein the polarities of the voltages applied to the red, green, blue, and white picture elements in the first picture element columns are the same as the polarities of the voltages applied to the red, green, blue, and white picture elements in the second picture element columns adjacent to the first picture element columns, respectively.

10. The display device according to claim 1, wherein capacitances between respective adjacent picture elements provide an increase in the absolute value of the voltage of the upper picture element, in the column direction, of the adjacent picture elements.

* * * * *